(12) United States Patent
Pavlov

(10) Patent No.: US 11,224,286 B2
(45) Date of Patent: Jan. 18, 2022

(54) GAMING SIMULATION CHASIS

(71) Applicant: HOME RACER LLC, Boynton Beach, FL (US)

(72) Inventor: Dimitar Pavlov, Boynton Beach, FL (US)

(73) Assignee: HOME RACER LLC, Boynton Beach, FL (US)

( * ) Notice: Subject to any disclaimer, the term of this patent is extended or adjusted under 35 U.S.C. 154(b) by 0 days.

(21) Appl. No.: 17/062,539

(22) Filed: Oct. 2, 2020

(65) Prior Publication Data

US 2021/0100365 A1 Apr. 8, 2021

Related U.S. Application Data

(60) Provisional application No. 62/984,787, filed on Mar. 3, 2020, provisional application No. 62/909,758, filed on Oct. 2, 2019.

(51) Int. Cl.
*A47B 21/03* (2006.01)
*A47C 7/62* (2006.01)
(Continued)

(52) U.S. Cl.
CPC .............. *A47B 21/02* (2013.01); *A47B 21/03* (2013.01); *A47B 21/0314* (2013.01); *A47B 83/02* (2013.01); *A47C 7/62* (2013.01); *A47C 7/70* (2013.01); *A47C 7/723* (2018.08); *A47C 15/004* (2013.01); *F16M 11/04* (2013.01);
(Continued)

(58) Field of Classification Search
CPC .... A47B 2200/0072; A47B 2021/0364; A47B 2021/0321; A47B 2083/025

USPC ......... 248/125.1, 125.9, 176.1, 176.3, 178.1, 248/179.1, 918; 297/161, 173, 174 R, 297/188.21; 108/147.19
See application file for complete search history.

(56) References Cited

U.S. PATENT DOCUMENTS 4,779,922 A * 10/1988 Cooper ................. F16M 11/10
297/188.21
5,653,499 A * 8/1997 Goodall .................. A47C 7/70
297/170

(Continued)

FOREIGN PATENT DOCUMENTS

CA 2687742 A1 * 6/2011 ............. F16M 11/28

*Primary Examiner* — Robert Canfield
(74) *Attorney, Agent, or Firm* — Mark C. Johnson; Johnson Dalal

(57) ABSTRACT

A gaming chair assembly with adjustable keyboard assembly having a base frame assembly with a tubular framing configuration and a keyboard tray assembly having a lower tubular arm member selectively and telescopically coupled to one of the plurality of base frame members in a selectively lockable configuration, a pivoting lower tubular arm member rotatably coupled to the lower tubular arm member, two upright tubular arm members coupled together, wherein one of the upright tubular arm members has a tubular t-post defining a through hole thereon. A keyboard support member is selectively, slidably, and lockably coupled to the tubular t-post and disposed within the through hole thereon and a keyboard tray member with a mounting bracket coupled thereto is pivotably coupled to a tray clamping member with a through hole defined thereon and that is selectively, slidably, and lockably coupled to the keyboard support member.

8 Claims, 58 Drawing Sheets

(51) Int. Cl.
    *A47B 83/02* (2006.01)
    *A47B 21/02* (2006.01)
    *A47C 7/70* (2006.01)
    *A47C 15/00* (2006.01)
    *A47C 7/72* (2006.01)
    *F16M 11/12* (2006.01)
    *F16M 11/04* (2006.01)

(52) U.S. Cl.
    CPC ...... *F16M 11/12* (2013.01); *A47B 2021/0321* (2013.01); *A47B 2021/0364* (2013.01); *A47B 2083/025* (2013.01); *A47B 2200/0072* (2013.01)

(56) References Cited

U.S. PATENT DOCUMENTS

| | | | | |
|---|---|---|---|---|
| 5,893,607 | A | * | 4/1999 | Trimnell .............. A61G 5/1094 297/170 |
| D656,553 | S | * | 3/2012 | Blaskov ....................... D21/326 |
| 2003/0042373 | A1 | * | 3/2003 | MacLeod ............... F16M 11/24 248/125.1 |
| 2003/0222186 | A1 | * | 12/2003 | Kim .................. G01M 17/0078 248/129 |
| 2006/0011790 | A1 | * | 1/2006 | Lenz ..................... F16M 11/42 248/176.3 |
| 2006/0022096 | A1 | * | 2/2006 | Chan ..................... F16M 13/02 248/129 |
| 2009/0218860 | A1 | * | 9/2009 | Hernandez ........... A47C 15/004 297/217.3 |
| 2010/0019548 | A1 | * | 1/2010 | Tajbakhsh .............. A47B 21/00 297/162 |
| 2010/0194155 | A1 | * | 8/2010 | Dankovich ............ A47C 7/727 297/188.21 |
| 2010/0201165 | A1 | * | 8/2010 | Dankovich .............. A47C 7/72 297/135 |

* cited by examiner

100

100

GAMING SIMULATION CHASIS

FIELD OF INVENTION

The present invention relates generally to gaming chair assemblies and, more particularly, relates to a gaming chair assembly with an adjustable keyboard assembly.

BACKGROUND OF THE INVENTION

Numerous industries such as, for example, the video game industry, and various technical training programs such as airline and commercial pilot flight training programs, require the use of chair assemblies configured in such a way as to give users the ability to maneuver controls, manipulate handles, and interact with computerized screens or simulators. In the video gaming industry, gaming chair assemblies have amassed great popularity and fame as users seek to maintain full comfort while gaming for hours without having to sacrifice the maneuverability and flexibility of movement needed to adequately perform. As such, a growing need in various industries has arisen for gaming chair assemblies that provide natural comfort, maneuverability, and adjustability. Existing prior art, however, does not provide solutions for such needs with respect, specifically, to attached keyboard assembly extensions and structural arms.

Existing prior art embodies varied gaming chair assemblies, some of which also contain adjustable keyboard assemblies. These known gaming chair assemblies that are operably configured to utilize a keyboard/mouse obstruct fail to provide sufficient adjustability for the users of said assemblies. Additionally, those known assemblies that do have a keyboard stand that are operable to adjust, fail to effectively lock and stay in their desired place. For example, during gameplay, where the chair framing is subjected to heightened vibrational forces, the keyboard and/or mouse support plates or trays become inadvertently loosened or otherwise dislodged out of their desired position.

Therefore, a need exists to overcome the problems with the prior art as discussed above.

SUMMARY OF THE INVENTION

The invention described herein provides unique and novel elements which differentiate it from existing prior art. Specifically, the telescopic and modular configuration of the structural arms that interconnect and form the gaming chair assembly allow users to flexibly rotate, pivot, and maneuver components of the keyboard and/or mouse assembly respectively around the gaming chair assembly, namely the base of said assembly. Not only may a user maneuver the keyboard assembly with great ease, but the range of motion that the telescopic and modular configuration facilitates is also substantial. The modular configuration of the structural arms facilitates easy mobility and control of the keyboard assembly without forcing a user to expend great force or effort to accomplish this goal.

Additional embodiments of the present invention provide a modular multi-monitor mount system that overcomes known disadvantages of those known devices and methods of this general type and that effectively and safely enables users to utilize external gaming controls, e.g., for flight or driving simulation. Although the invention is illustrated and described herein as embodied in a gaming chair frame assembly, it is, nevertheless, not intended to be limited to the details shown because various modifications and structural changes may be made therein without departing from the spirit of the invention. Additionally, well-known elements of exemplary embodiments of the invention will not be described in detail or will be omitted so as not to obscure the relevant details of the invention.

It is to be understood that the disclosed embodiments herein are merely exemplary of the invention, which can be embodied in various forms. Therefore, specific structural and functional details disclosed herein are not to be interpreted as limiting, but merely as a basis for future claims and as a representative basis for teaching one of ordinary skill in the art to variously employ the present invention in virtually any appropriately detailed structure. Further, the terms and phrases used herein are not intended to be limiting; but rather, to provide an understandable description of the invention. It is believed that the invention will be better understood from a consideration of the following description in conjunction with the drawing figures, in which like reference numerals are carried forward. The figures of the drawings are not drawn to scale and the dimensions, while preferred, are exemplary and approximate.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the tubing or member length, wherein "transverse" should be understood to mean a direction corresponding to a direction opposite the longitudinal length.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
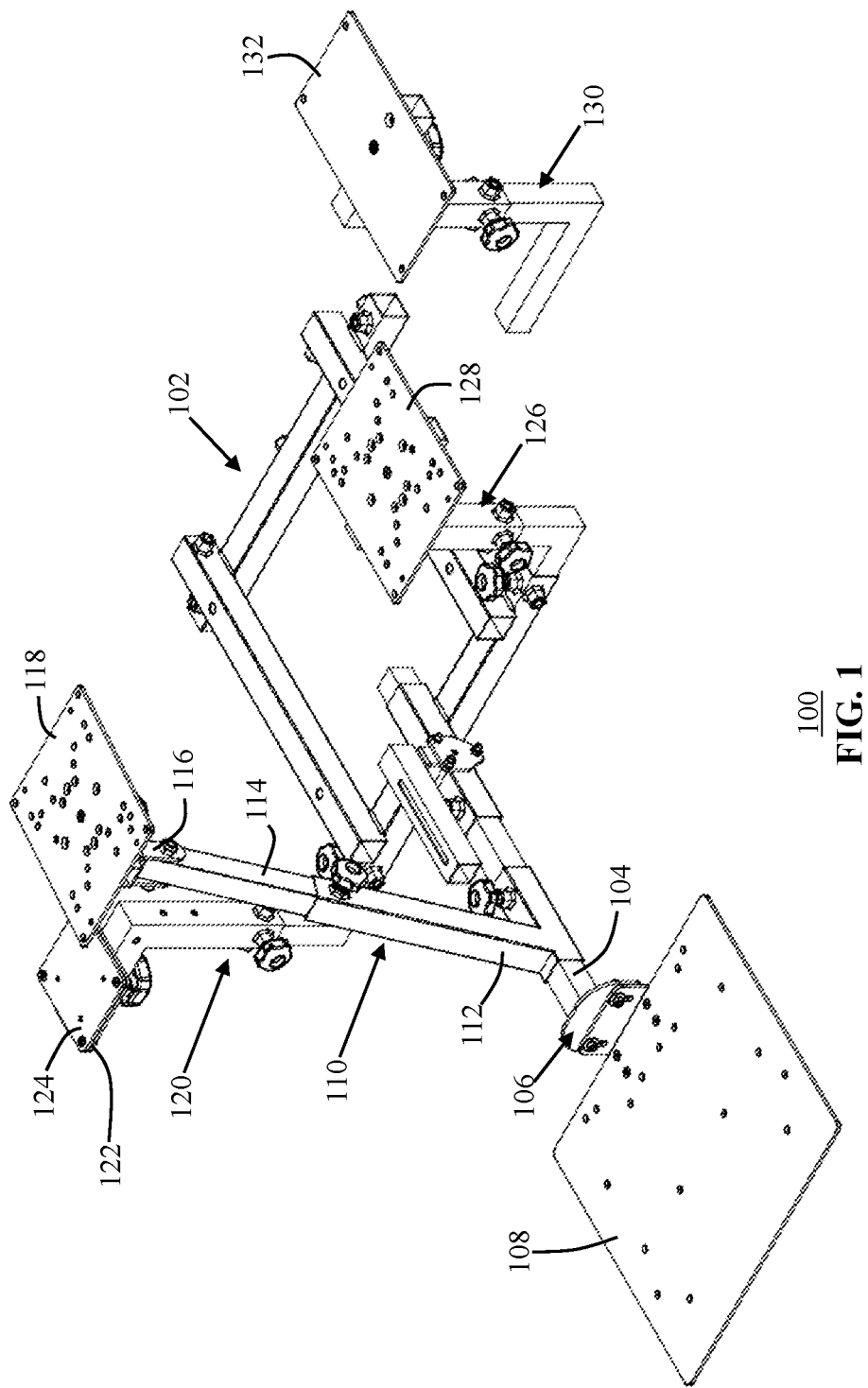
FIG. 1 is a downward facing perspective view of a gaming chair assembly, in accordance with an exemplary embodiment of the present invention.
Figure 2:
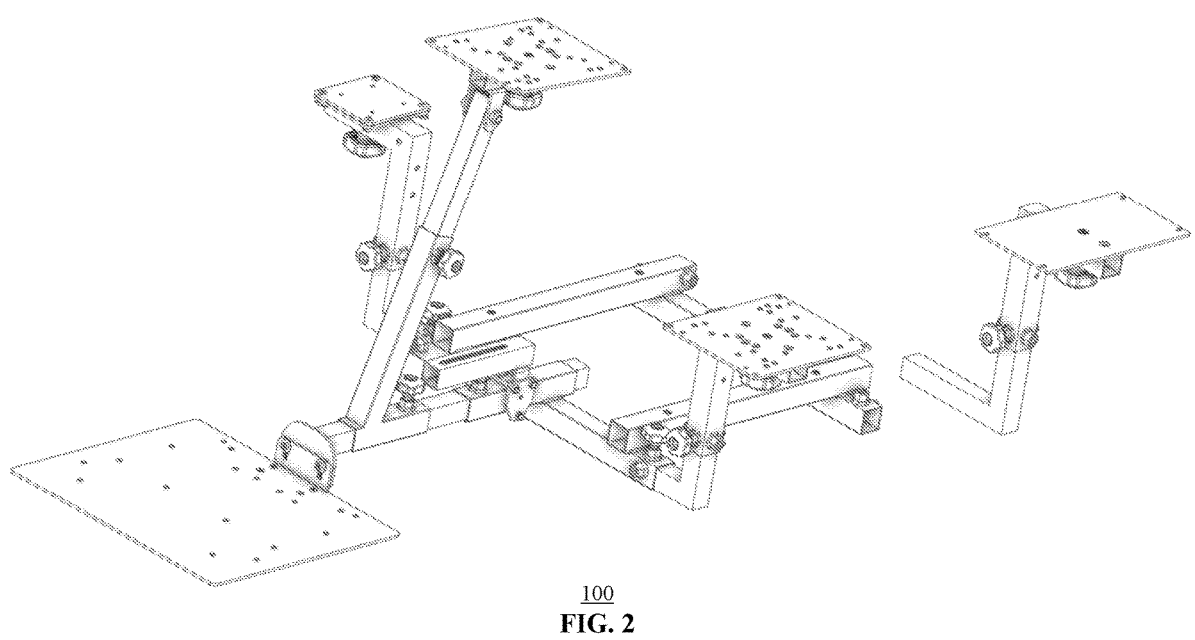
FIG. 2 is a side perspective view of a gaming chair assembly, in accordance with an exemplary embodiment of the present invention.
Figure 3:
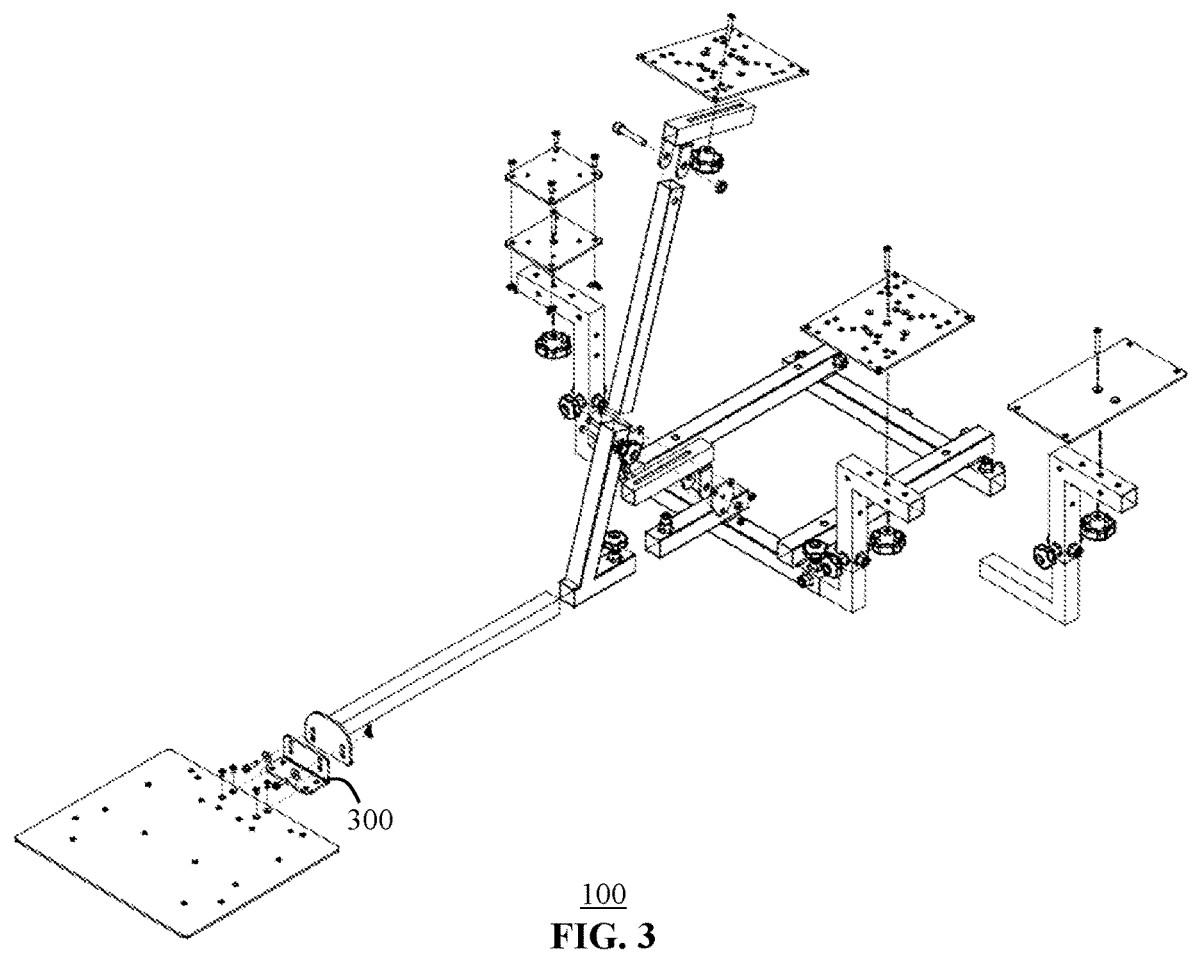
FIG. 3 is an exploded top view of a gaming chair assembly, in accordance with an exemplary embodiment of the present invention.
Figure 4:
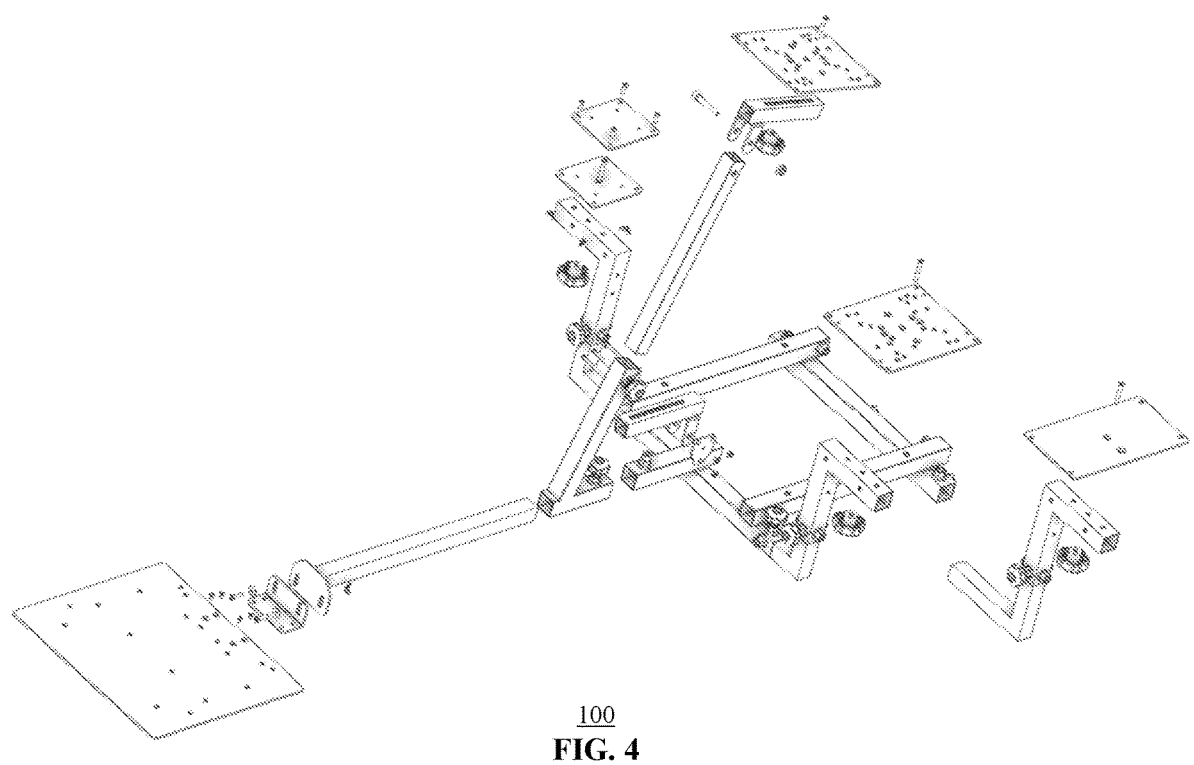
FIG. 4 is an exploded top view of a gaming chair assembly, in accordance with an exemplary embodiment of the present invention.

Referring now to FIGS. 1-8 and FIGS. 37-39, various configurations of the present invention are shown in perspective views. Said figures, along with others herein, show several advantageous features and components of the present invention, but, as will be described below, the invention can be provided in several shapes, sizes, combinations of features and components, and varying numbers and functions of the components. With reference specifically to FIGS. 1-8, some exemplary and beneficial components of the present invention include:
1. A base frame assembly 102
2. A main rudder support member 104
3. A main rudder support plate 108
4. A center post assembly 110
5. A center stick plate mounting member 116
6. A large universal plate (LUP) 118
7. A first arm assembly 120
8. A lower small universal plate (LSUP) 122
9. An upper small universal plate (USUP) 124
10. A second arm assembly 126
11. A second LUP 128
12. A third arm assembly 130
13. A medium universal plate (MUP) 132
14. A universal steering wheel plate (USWP) 2700
15. A steering wheel plate bracket (SWPB) 2800
16. A keyboard/mouse attachment assembly 3700

The base frame assembly 102, along with other components depicted within the figures, may be of a substantially rigid and durable material, such as stainless steel that may be powder coated. The base frame assembly 102 may be formed with hollow squared tubing for effective and easy coupling of individual components thereto. The base frame assembly 102 may also be formed with apertures defined thereon for entry and egress of one or more fastener(s)—as depicted within some of the figures.

Figure 5:
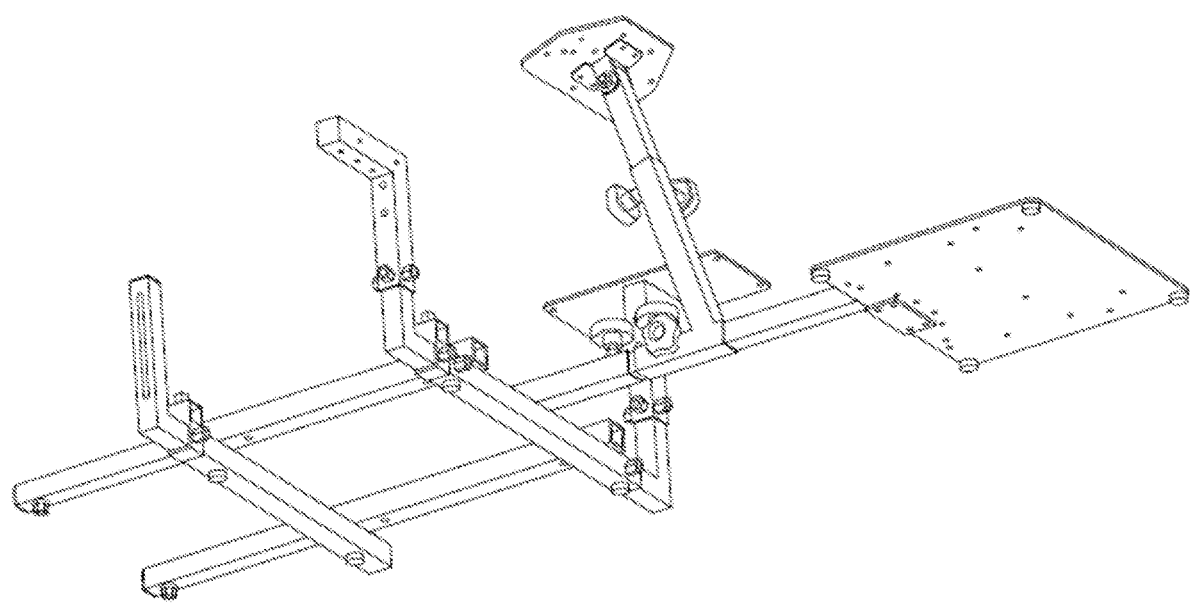
FIG. 5 is an upward facing perspective view of a gaming chair assembly, in accordance with an exemplary embodiment of the present invention.
Figure 6:
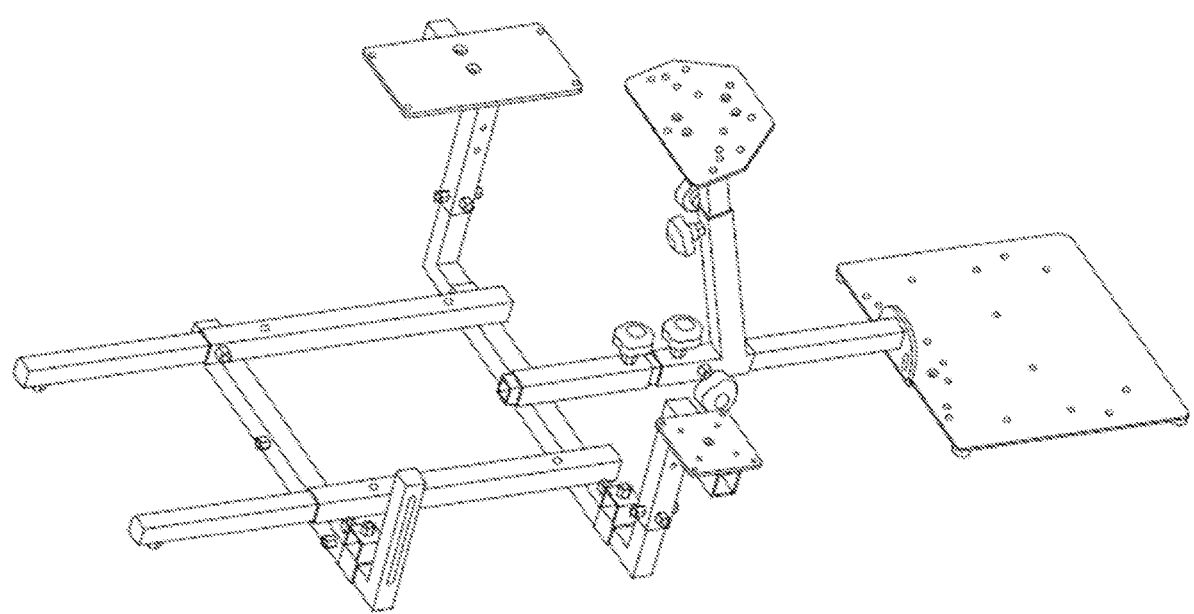
FIG. 6 is a downward facing perspective view of a gaming chair assembly, in accordance with an exemplary embodiment of the present invention.
Figure 7:
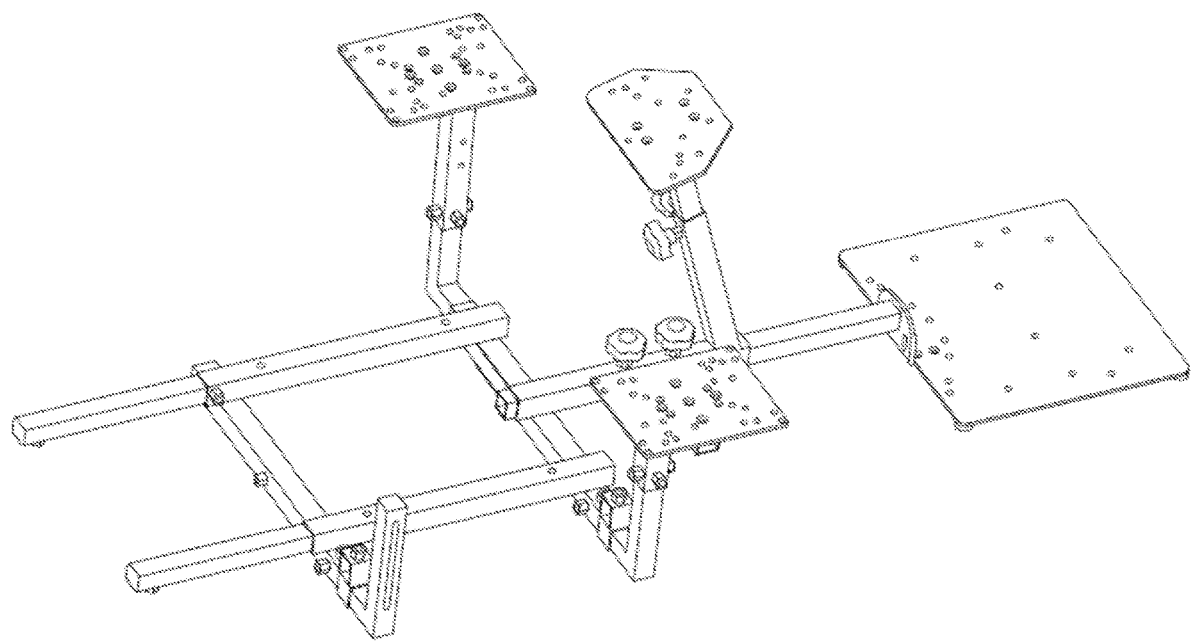
FIG. 7 is a downward facing perspective view of a gaming chair assembly, in accordance with an exemplary embodiment of the present invention.
Figure 8:
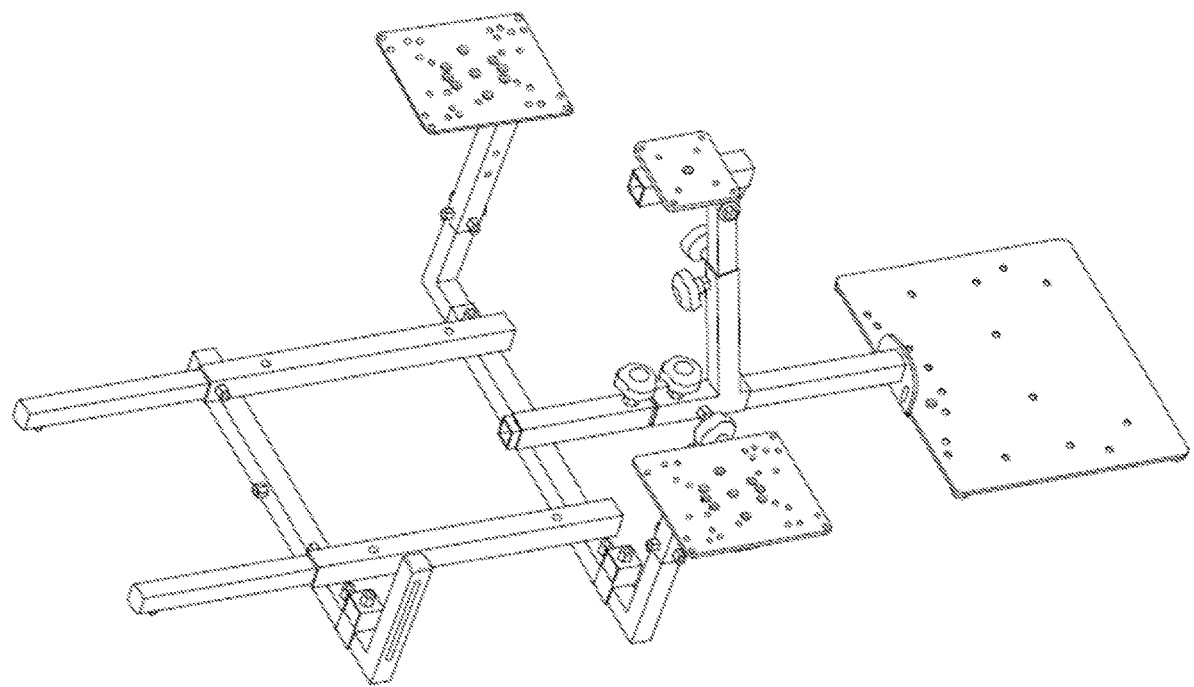
FIG. 8 is a downward facing perspective view of a gaming chair assembly, in accordance with an exemplary embodiment of the present invention.

As depicted best in detail within FIGS. 9-12, the base frame assembly 102 includes a main rudder support member 104 telescopically coupled to the base frame assembly 102 and with a distal end 106 translatably coupled to a main rudder support plate 108. Said differently, the distal end 106 may be configured in the form of a face defining one or more slots enabling substantial linear movement with respect to the main rudder support plate 108, namely an attachment bracket 300 (shown best in FIGS. 11-12). As such, the main rudder support member 104 may be substantially planar with respect to the ground surface in which the base frame assembly 102 rests, thereby accommodating uneven floors. To that end, as best seen in FIG. 5, the assembly may include a plurality of castors or resting pads that may facilitate in leveling the assembly and/or transporting the assembly or causing the assembly to resist linear movement. The distal end 106 may also be able to twist slightly with respect to the cockpit mounting plate 108.

Figure 9:
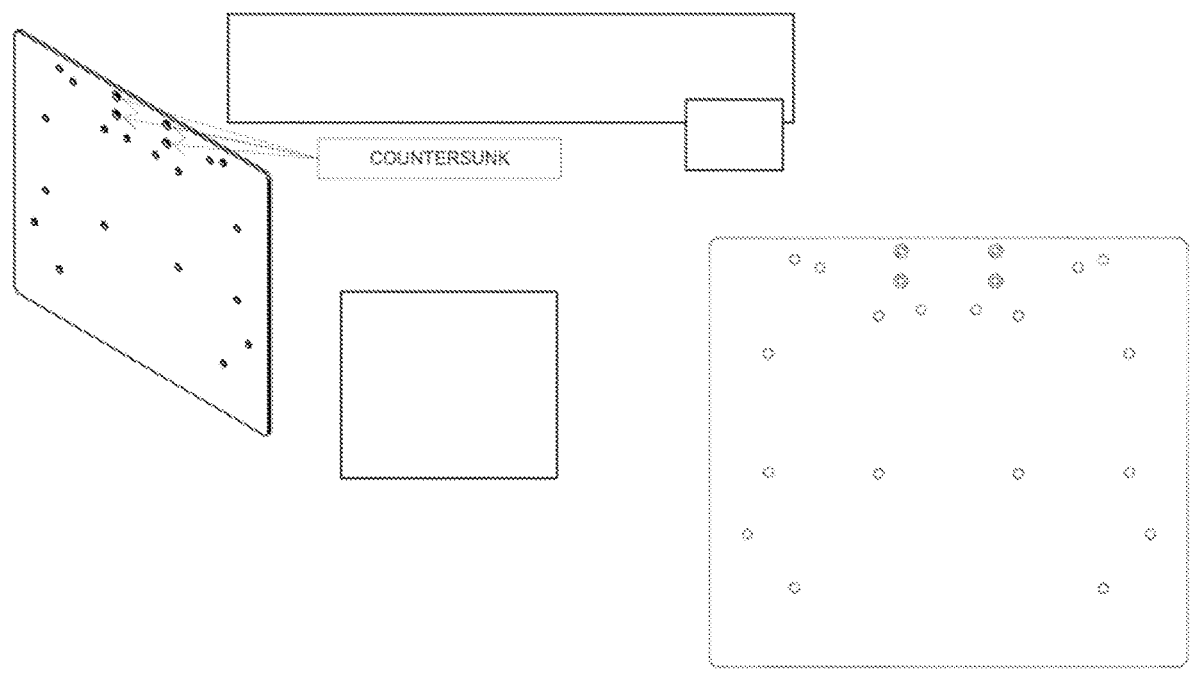
FIG. 9 is a planar side view of a main rudder support member, in accordance with an exemplary embodiment of the present invention.
Figure 10:
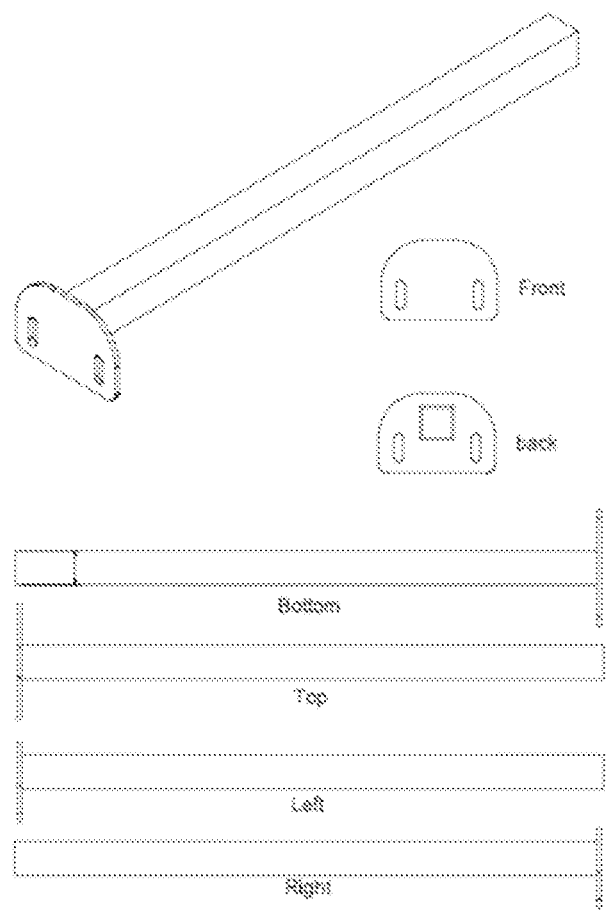
FIG. 10 is a side view of a main rudder support member, in accordance with an exemplary embodiment of the present invention.
Figure 11:
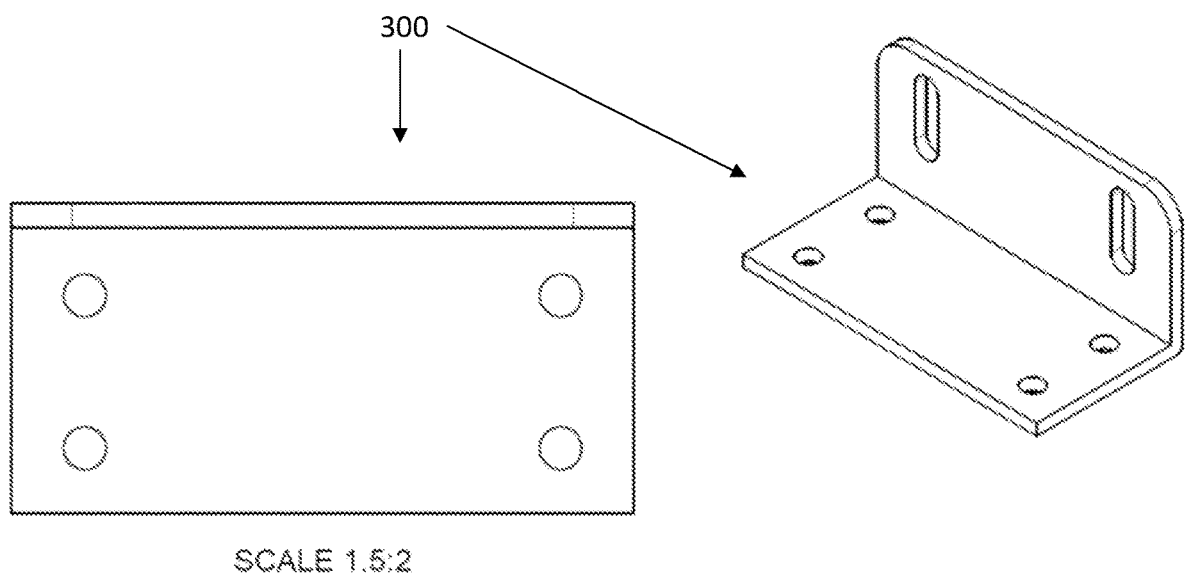
FIG. 11 is a planar and perspective view of an attachment bracket, in accordance with an exemplary embodiment of the present invention.
Figure 12:
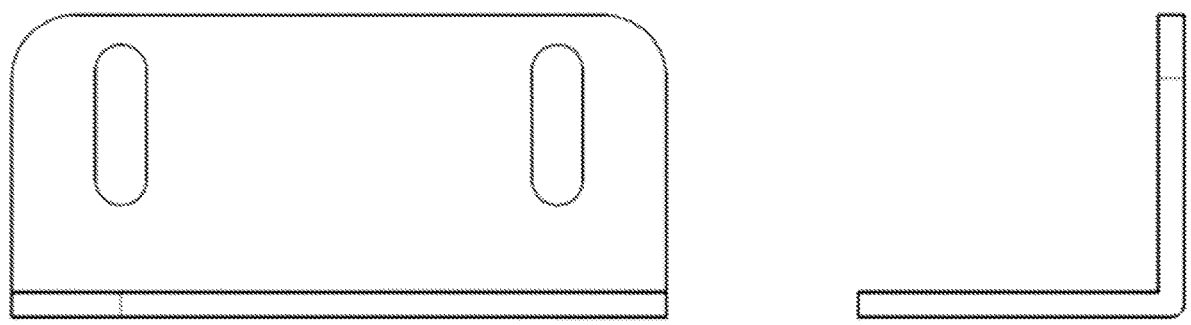
FIG. 12 is a side planar and perspective view of an attachment bracket, in accordance with an exemplary embodiment of the present invention.
Figure 13:
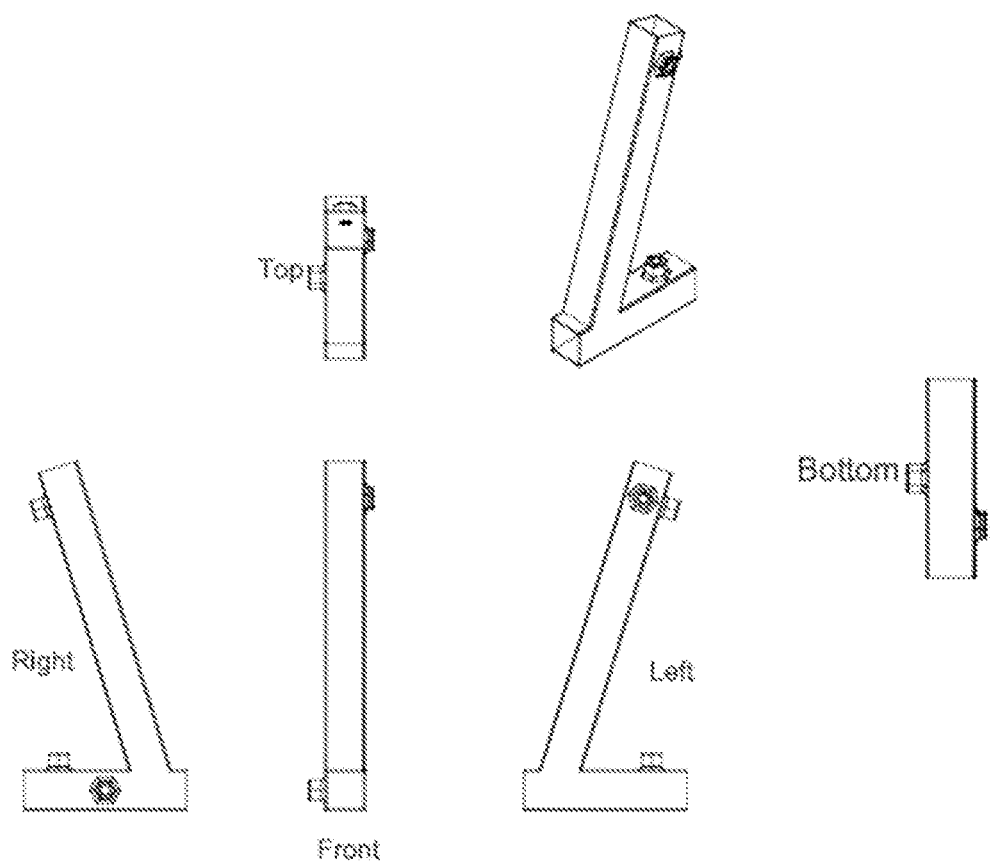
FIG. 13 is a side perspective view of a center post assembly, in accordance with an exemplary embodiment of the present invention.
Figure 14:
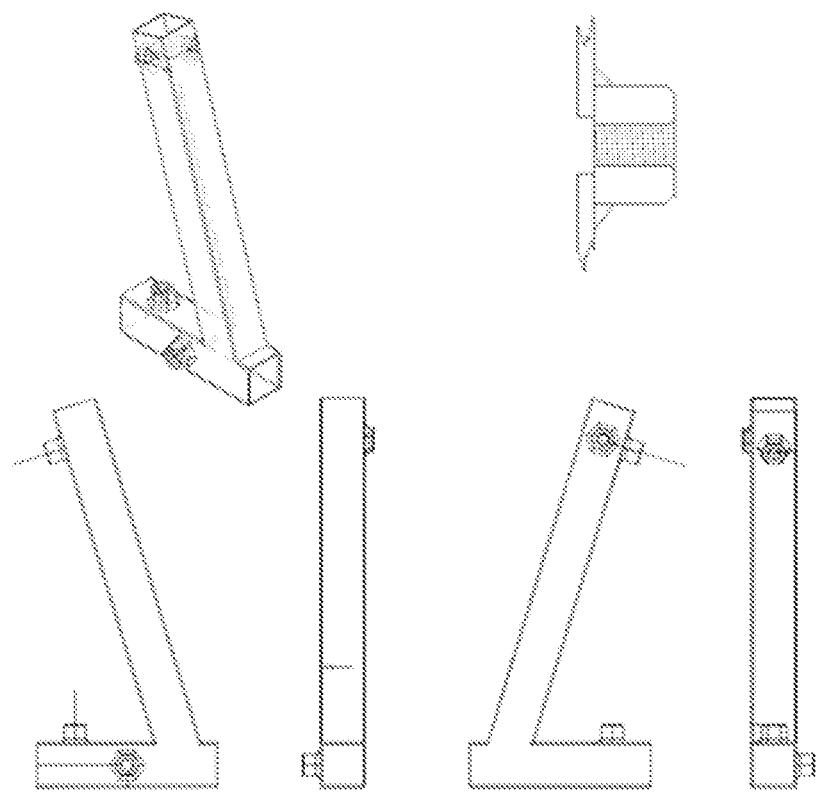
FIG. 14 is a side perspective view of a center post assembly, in accordance with an exemplary embodiment of the present invention.
Figure 15:
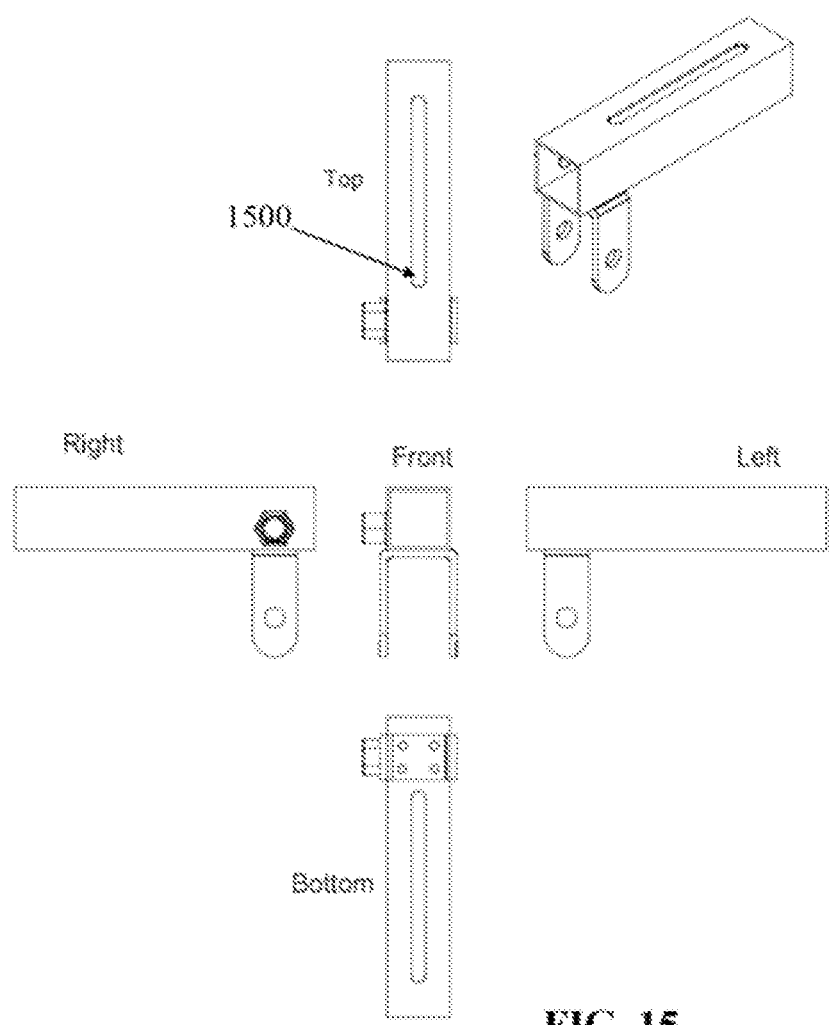
FIG. 15 is a side perspective view of a center post assembly, in accordance with an exemplary embodiment of the present invention.
Figure 16:
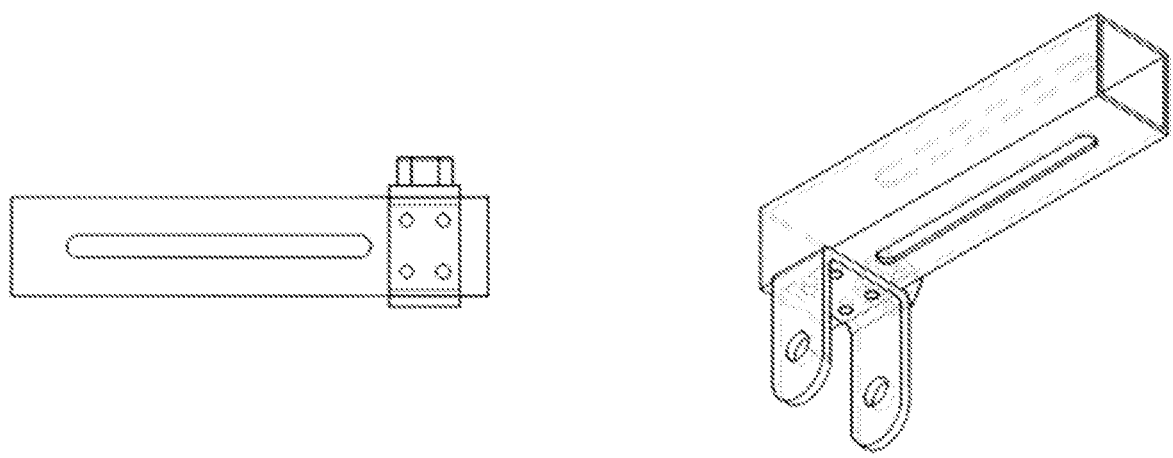
FIG. 16 is an upward facing perspective view of a center post assembly, in accordance with an exemplary embodiment of the present invention.
Figure 17:
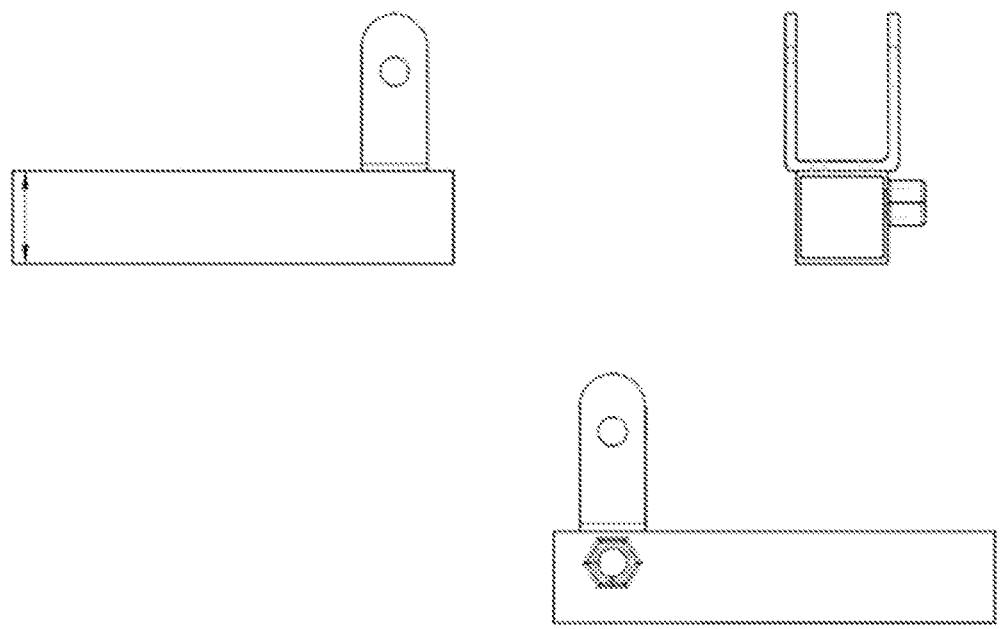
FIG. 17 is a side planar view of a center post assembly, in accordance with an exemplary embodiment of the present invention.
Figure 18:
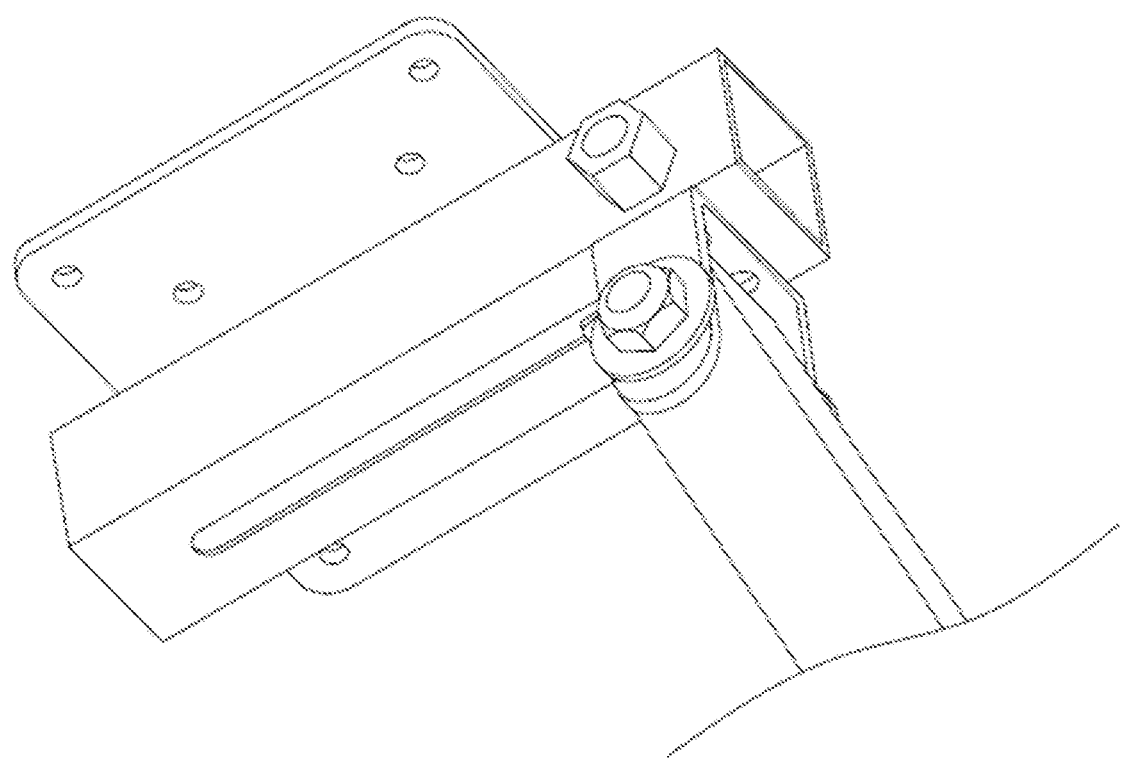
FIG. 18 is an upward facing perspective view of a center post assembly, in accordance with an exemplary embodiment of the present invention.
Figure 19:
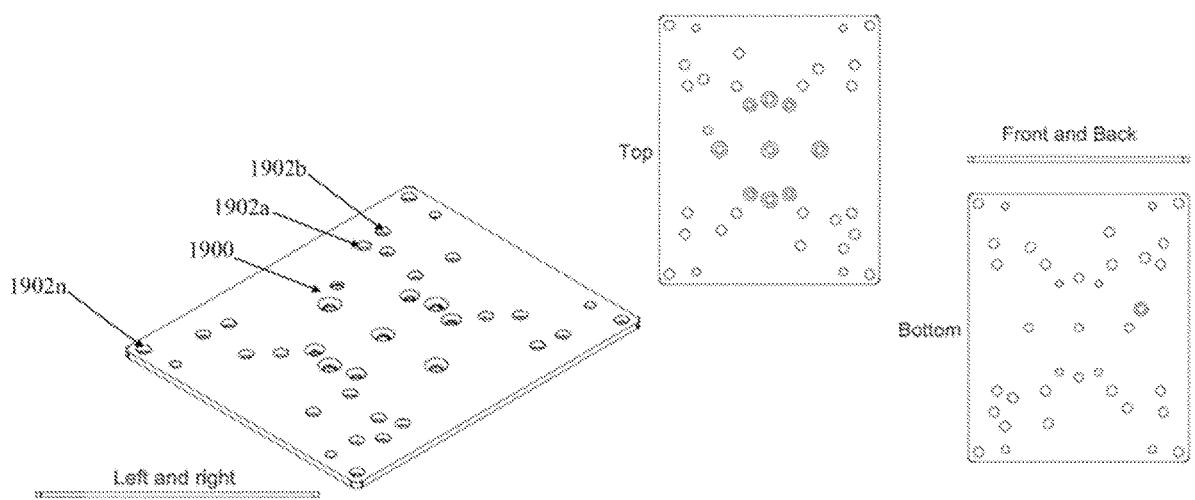
FIG. 19 is a perspective top view of a large universal plate, in accordance with an exemplary embodiment of the present invention.

The main rudder support plate 108 may also include a front surface, a rear surface opposing the front surface of the main rudder support plate 108, a thickness separating the front and rear surfaces of the main rudder support plate 108, and a mounting aperture configuration defining a plurality of apertures each spanning the thickness of the main rudder support plate 108. The specifically configured, spaced, and designed mounting aperture configuration (as best shown in FIG. 9) facilitates in accommodating mechanical coupling to a variety of external rudder pedal assemblies. Some of the aperture(s) also specifically configured and countersunk to enable level attachment with a rudder pedal assembly.

As depicted best in detail within FIGS. 13-18, the center post assembly 110 has a lower section 112 translatably coupled to the main rudder support member 104 and is telescopically coupled to an upper section 114 of the center post assembly 110. The center stick plate mounting member 116 may be beneficially rotatably coupled to the upper section 114 of the center post assembly 110 and has an enclosed channel 1500 defined on an upper surface thereon. The enclosed channel 1500, which is defined on the upper and lower opposing surfaces on the center stick plate mounting member 116, enables a plate coupled thereto to translate linearly and/or rotationally thereon. The center stick plate mounting member 116 is mechanically coupled to the upper section 114 of the center post assembly 110 with, for example, a 55 mm stainless steel bolt. To resist against rotational movement of the center stick plate mounting member 116 when attached to the upper section 114 of the center post assembly 110, two internal/external toothed washers may be utilized with U-shaped posts on the center stick plate mounting member 116. The center stick plate mounting member 116 is uniquely configured to provide effective movement, placement, and coupling with a plate (as discussed herein). Additionally, one end of the center stick plate mounting member 116 may be open, thereby allowing another post member to be inserted therein, e.g., for coupling a display. When not desired for use, each end of the center stick plate mounting member 116 (like any other of the hollowed tubing) may include a selectively removably end cap coupled thereto.

Figure 20:
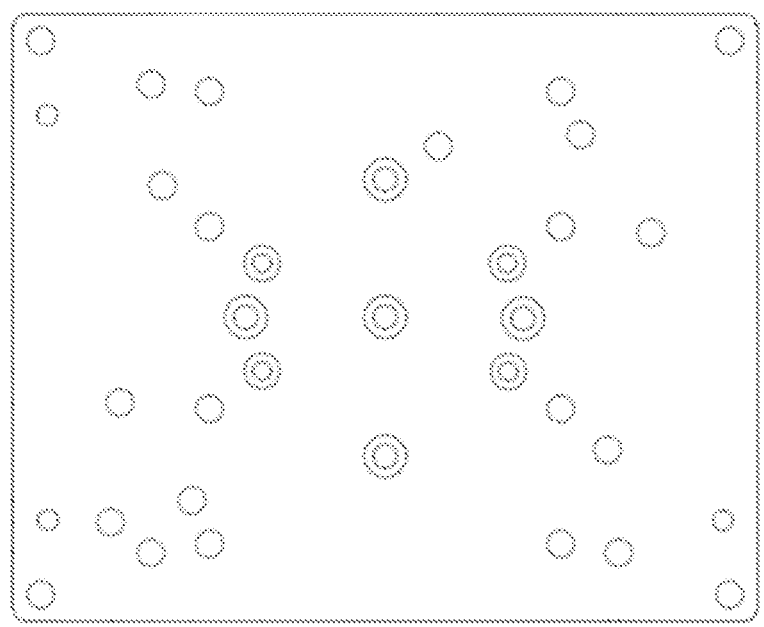
FIG. 20 is a top planar view of a mounting aperture configuration, in accordance with an exemplary embodiment of the present invention.
Figure 21:
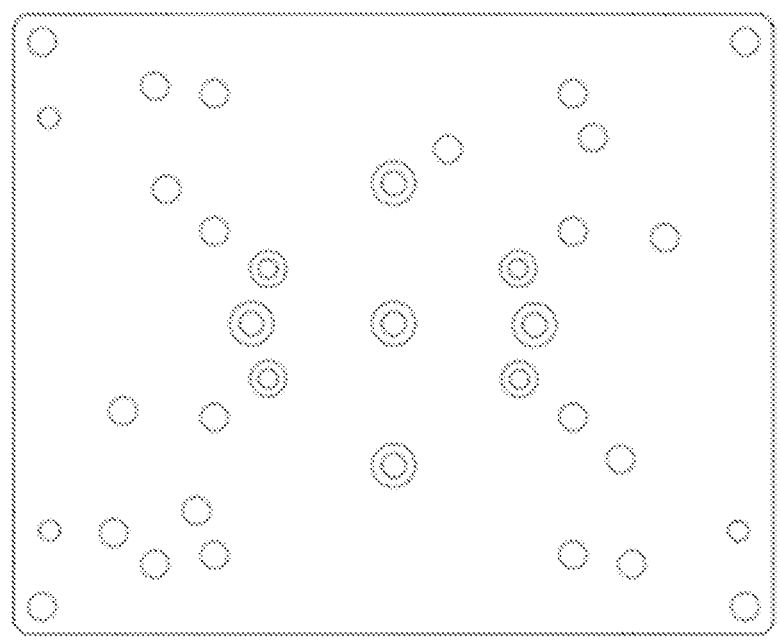
FIG. 21 is a top planar view of a mounting aperture configuration, in accordance with an exemplary embodiment of the present invention.
Figure 22:
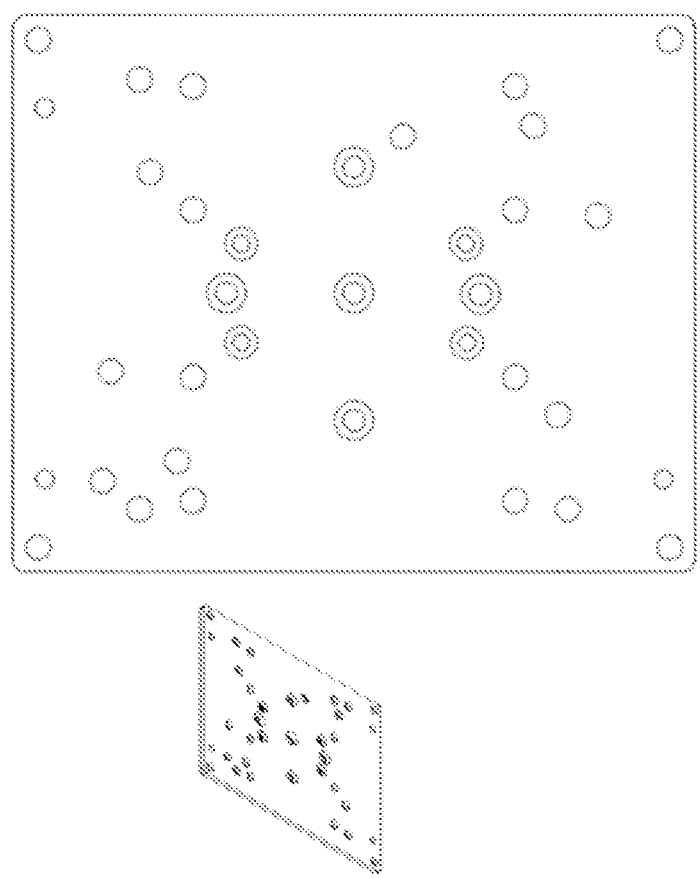
FIG. 22 is a top planar view of a mounting aperture configuration, in accordance with an exemplary embodiment of the present invention.
Figure 23:
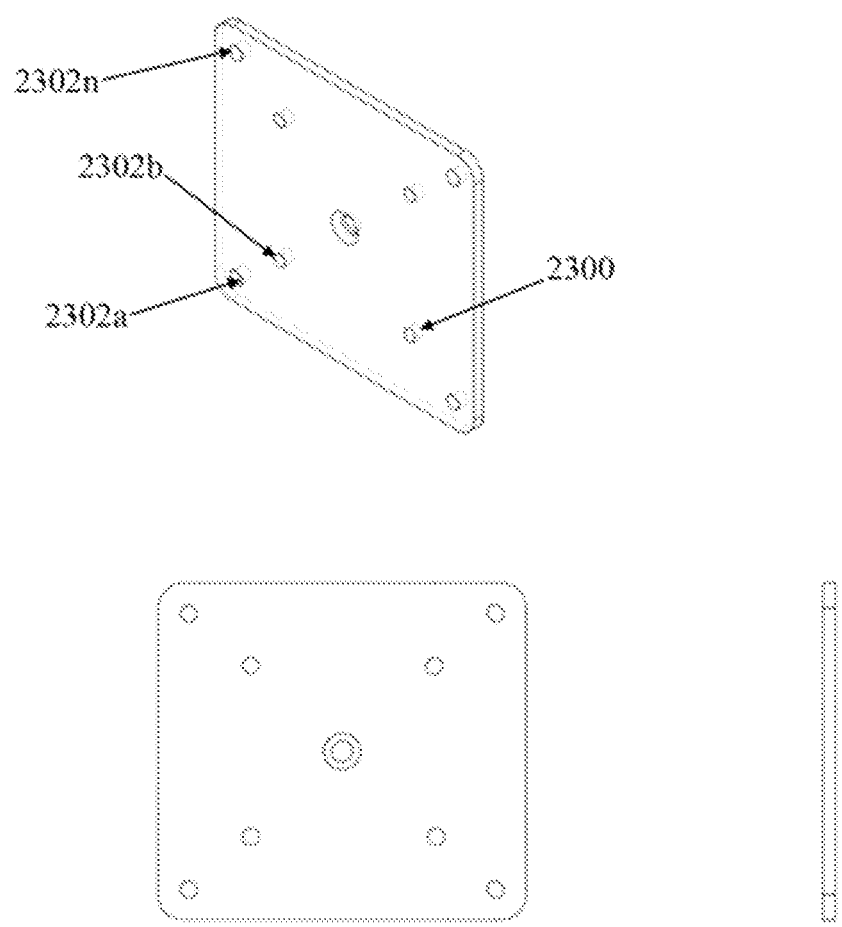
FIG. 23 is a perspective and planar view of a first arm assembly, in accordance with an exemplary embodiment of the present invention.

As depicted best in detail within FIGS. 18-22, the large universal plate (LUP) 118 is mechanically coupled to the center stick plate mounting member 116 and has a front surface, a rear surface opposing the front surface of the LUP 118, an LUP thickness separating the front and rear surfaces of the LUP 118, and a mounting aperture configuration 1900 defining a plurality of apertures 1902a-n each spanning the LUP thickness, wherein "n" represents any number greater than two. The specifically configured, spaced, and designed mounting aperture configuration (as best shown in FIGS. 20-22) facilitates in accommodating mechanical coupling to a variety of external control or input assemblies, e.g., flight joysticks, yokes, etc. Some of the aperture(s) also specifically configured and countersunk to enable level attachment with the external control or input assemblies.

Figure 27:
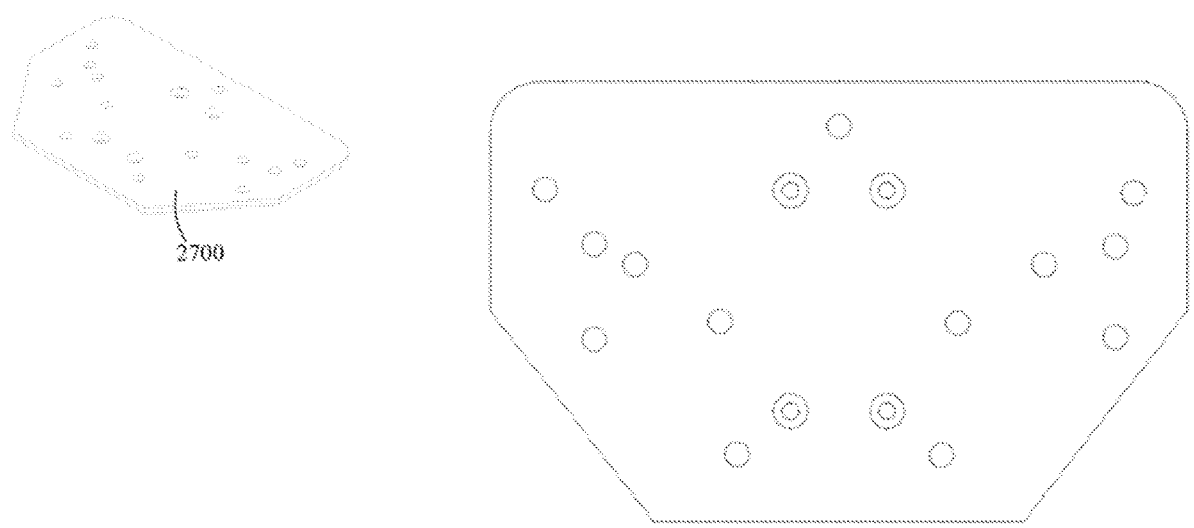
FIG. 27 is a top planar view of a universal steering wheel plate, in accordance with an exemplary embodiment of the present invention.
Figure 28:
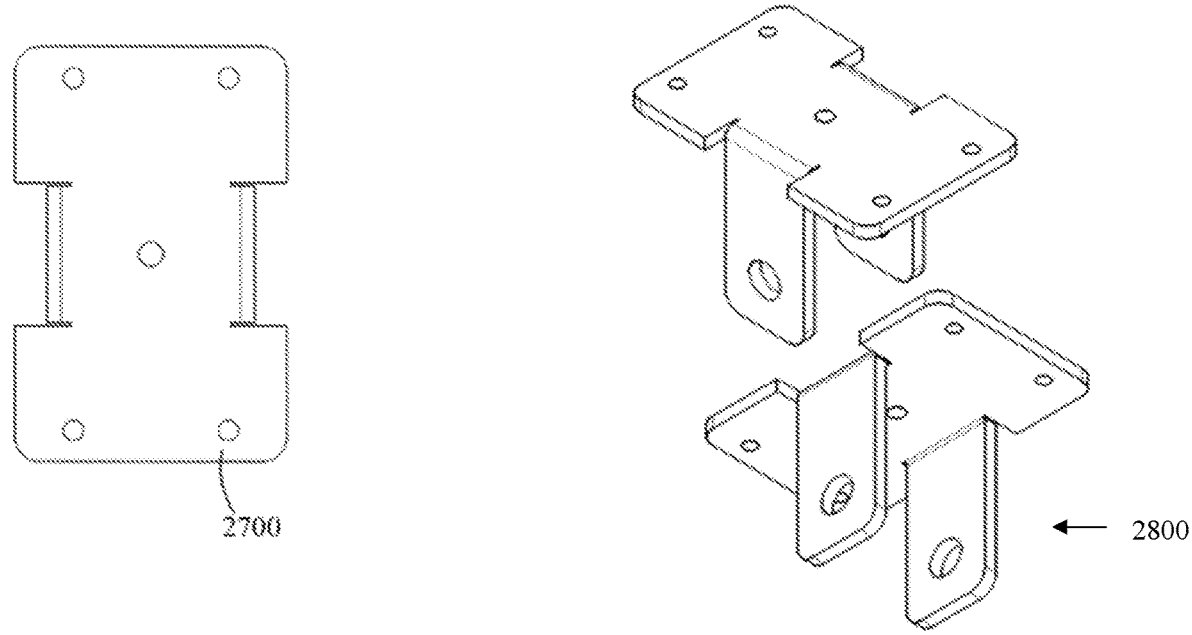
FIG. 28 is an upward facing perspective view of a steering wheel plate bracket, in accordance with an exemplary embodiment of the present invention.
Figure 29:
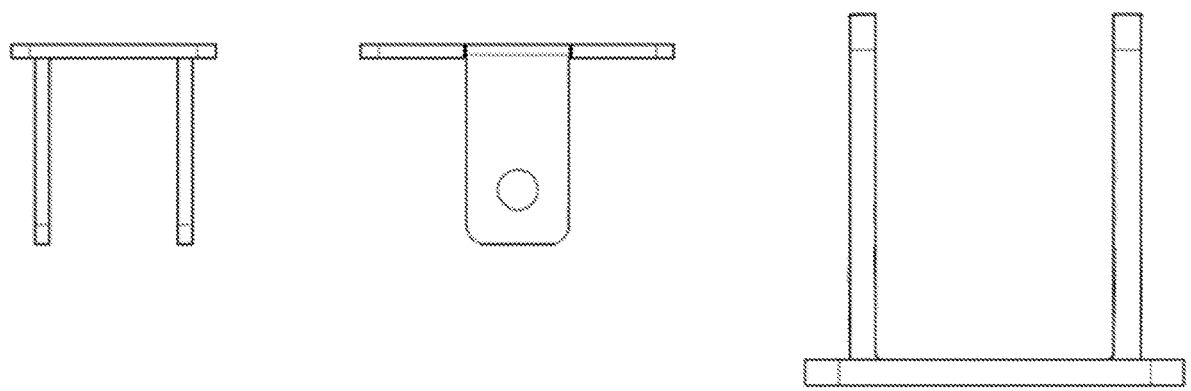
FIG. 29 is a perspective side view of a steering wheel plate bracket, in accordance with an exemplary embodiment of the present invention.
Figure 30:
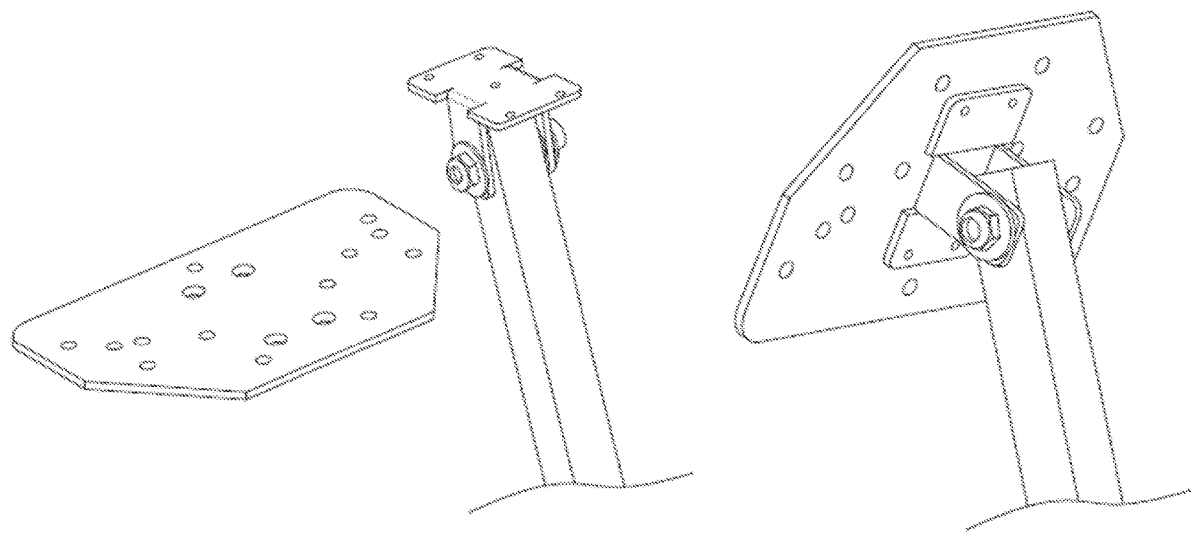
FIG. 30 is an upward facing perspective view of a mounting aperture configuration, in accordance with an exemplary embodiment of the present invention.
Figure 31:
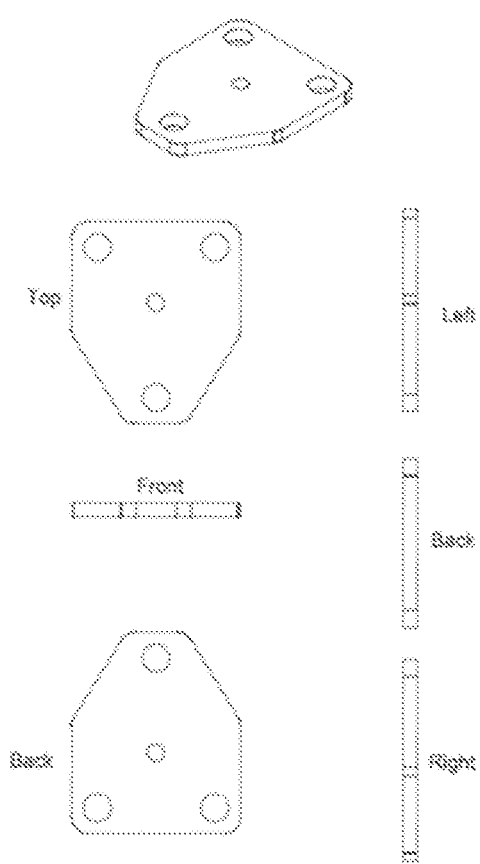
FIG. 31 is a top perspective view of a universal steering wheel plate, in accordance with an exemplary embodiment of the present invention.
Figure 32:
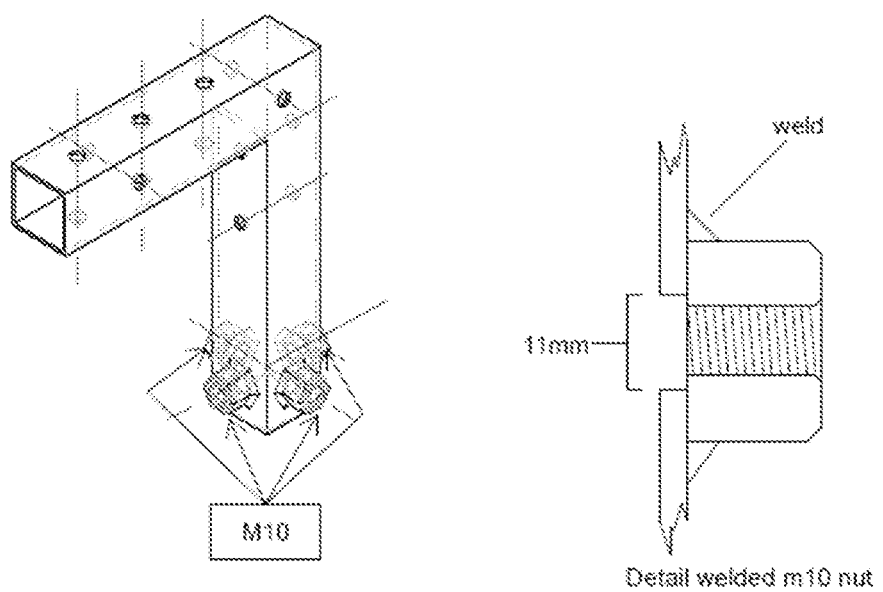
FIG. 32 is a downward facing perspective view of a first arm assembly, in accordance with an exemplary embodiment of the present invention.
Figure 33:
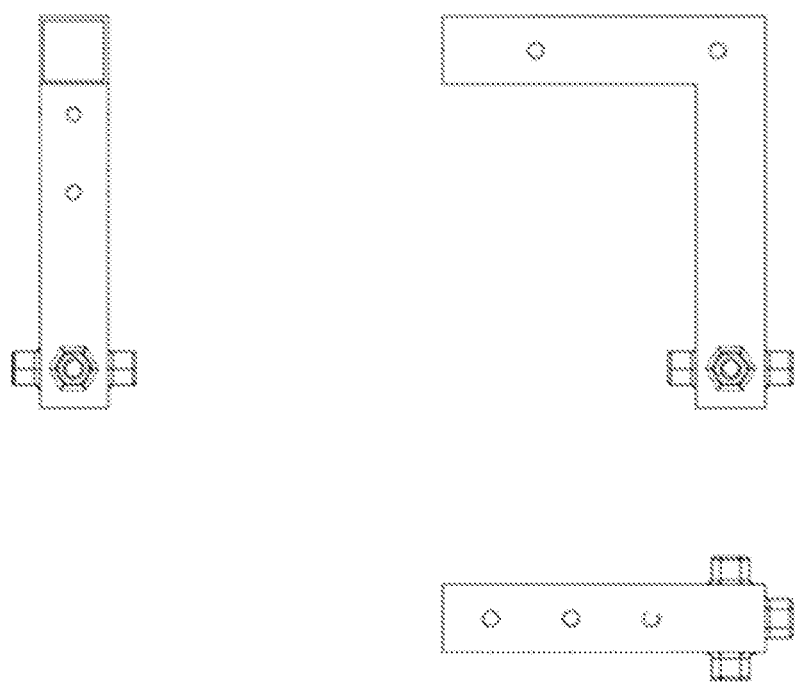
FIG. 33 is a side planar view of a first arm assembly, in accordance with an exemplary embodiment of the present invention.
Figure 34:
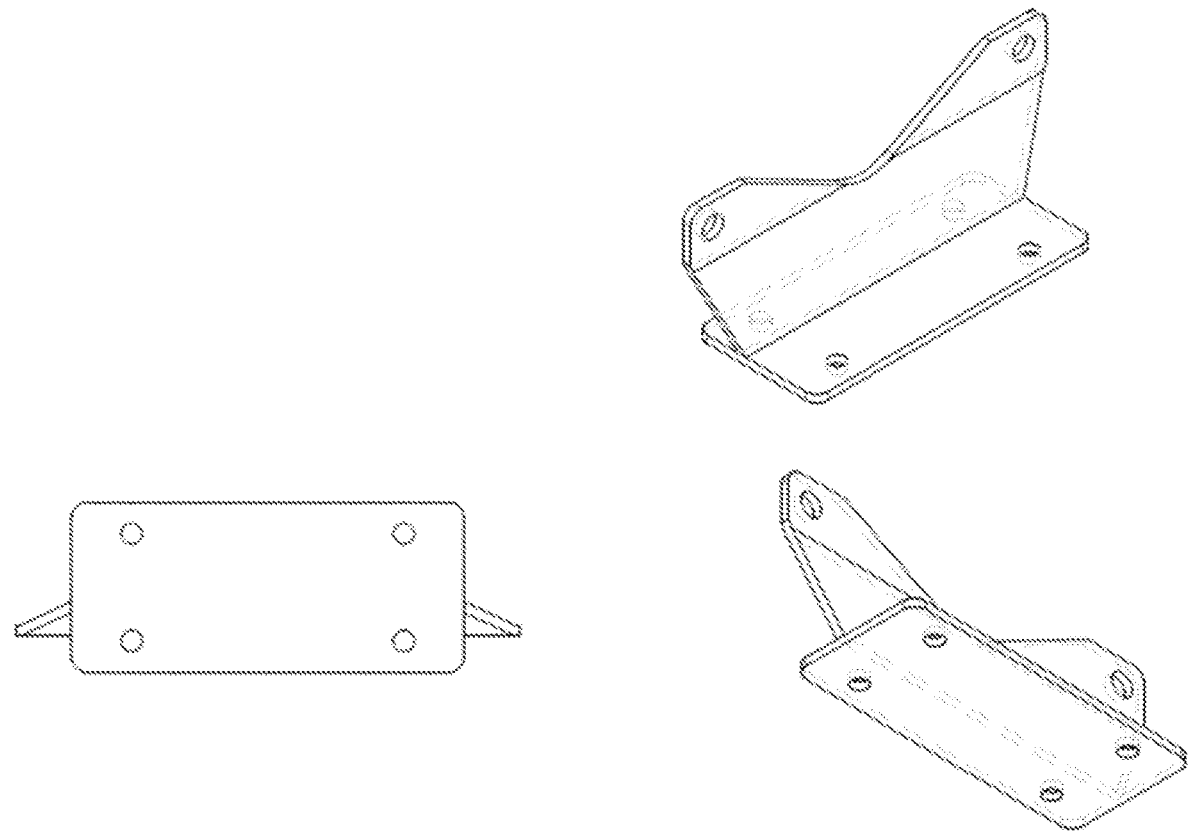
FIG. 34 is a perspective view of an arm assembly, in accordance with an exemplary embodiment of the present invention.
Figure 35:
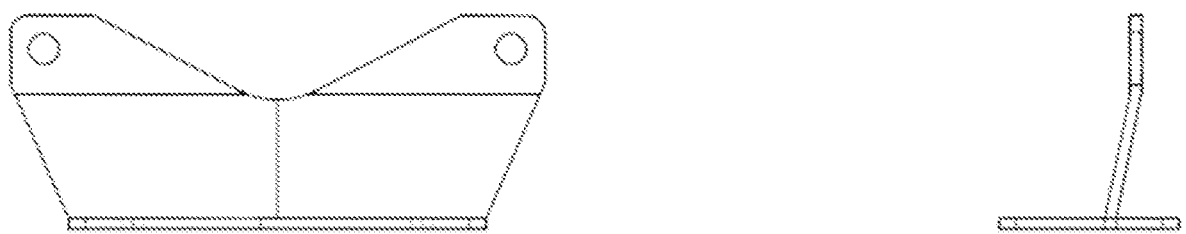
FIG. 35 is a side planar view of an arm assembly, in accordance with an exemplary embodiment of the present invention.
Figure 36:
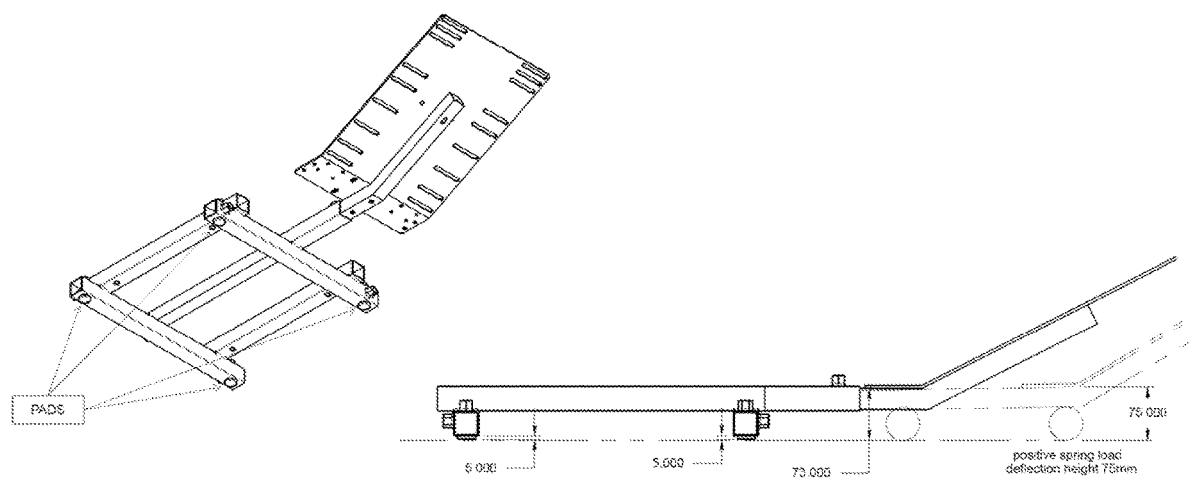
FIG. 36 is a perspective side view of a main rudder support plate, in accordance with an exemplary embodiment of the present invention.

In other embodiments, as depicted best within FIGS. 27-30, a universal steering wheel plate (USWP) 2700 may be employed in lieu of the LUP 118. The USWP 2700 is beneficially includes a mounting aperture configuration defining a plurality of apertures thereon, wherein each of the apertures span the USWP thickness. Like the other mounting aperture configurations, a significantly amount of time and testing was spent generating the specifically configured, spaced, and designed mounting aperture configuration (as best shown in FIG. 27) that facilitates in accommodating mechanical coupling to a variety of external control or input assemblies, namely steering wheels, in addition to effective and safe mechanical coupling components of the gaming chair frame assembly. Some of the aperture(s) also specifically configured and countersunk to enable level attachment with the external control or input assemblies.

To enable rotatably movement and mechanical coupling with the upper section 114 of the center post assembly 110, the steering wheel plate bracket (SWPB) 2800 is utilized. The SWPB 2800 is best shown depicted within FIG. 28. The SWPB 2800 is also beneficially designed with a mounting aperture configuration specifically configured, spaced, and designed to facilitate in mechanical coupling with the USWP 2700 and other plates. The SWPB 2800 is also 4 mm plate steel and is substantially rigid.

As depicted best in detail within FIGS. 23-24 and FIGS. 32-34, the first arm assembly 120 may be couplable to the base frame assembly 102. The first arm assembly 120 may be composed of two of more sections telescopically connected together. As discussed previously, the sections of the first arm assembly 120 (along with other arm assemblies described herein) may be of a hollow squared tubing that also facilitates in enabling 90° selective re-orientation by the user for more effective or comfortable use of components attached thereto. To that end, the first arm assembly 120 may be coupled to a lower small universal plate (LSUP) 122 (depicted best in detail within FIG. 23) having a front surface, a rear surface opposing the front surface of the LSUP 122, an LSUP thickness separating the front and rear surfaces of the LSUP 122, and a mounting aperture configuration 2300 defining a plurality of apertures 2300a-n each spanning the LSUP thickness.

In one exemplary embodiment, the lower section of each arm assembly is 30 mm square tube and may be of an L-shape and the upper section of each arm assembly is 55 mm hollowed square tube and may be of an L-shape. The lower and upper sections of each arm assembly may beneficially enable selective height and width adjustment by the user via translation of each respective section (and locking into place through use of one or more fastener(s), e.g., a knob with a rubber coating for effective and efficient use) and/or inversion of each respective section of the each arm assembly. In preferred embodiments, each arm assembly may also utilize at least two knob fasteners oriented on two substantially orthogonal sides of the section(s), thereby preventing lateral and longitudinal movement of the inner telescopic section when coupled to the outer telescopic section (which many gaming users find desirable).

Figure 24:
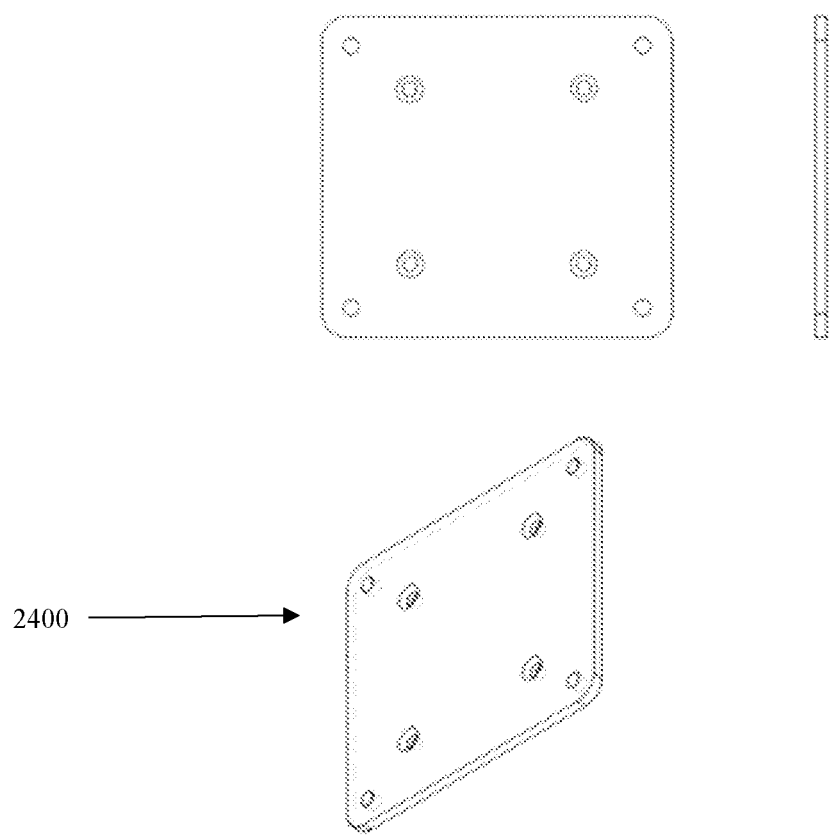
FIG. 24 is a perspective and planar view of a first arm assembly, in accordance with an exemplary embodiment of the present invention.

The LSUP 122 may be interposed between and mechanically coupled to an upper small universal plate (USUP) 124 (depicted best in detail within FIG. 24) having a front surface, a rear surface opposing the front surface of the USUP 124, an USUP thickness separating the front and rear surfaces of the USUP 124, and a mounting aperture configuration 2400 defining a plurality of apertures 2402a-n each spanning the USUP thickness. In one embodiment, the specifically configured, spaced, and designed mounting aperture configuration 2400 (as best shown in FIG. 24) facilitates in accommodating mechanical coupling to a variety of external control or input assemblies, e.g., throttle, gear shifter, etc.

Figure 25:
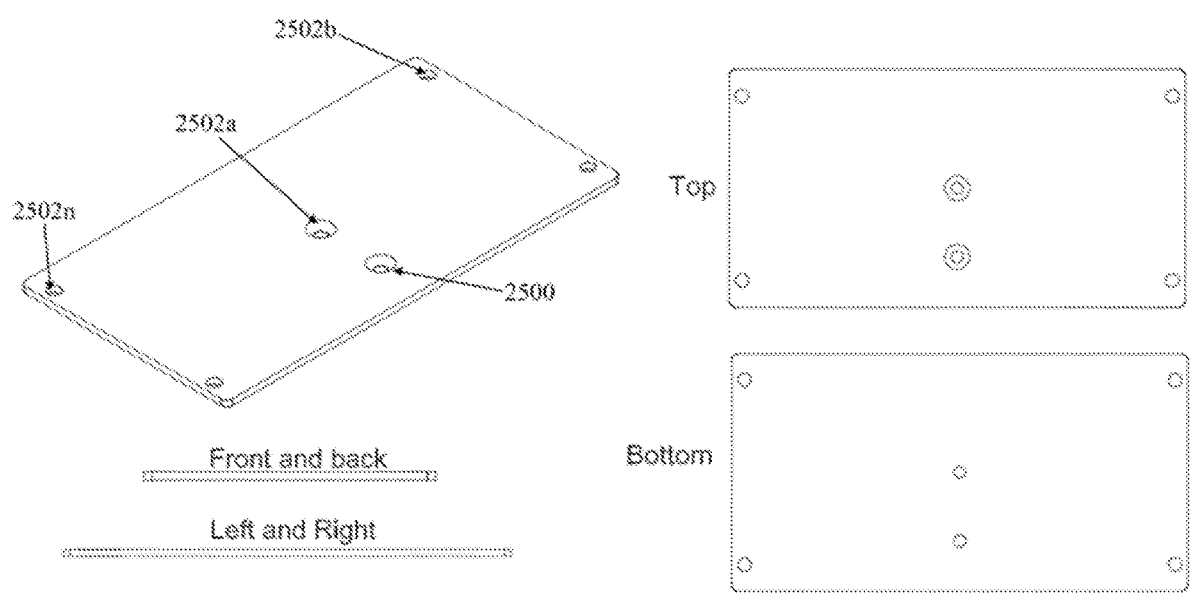
FIG. 25 is a perspective side view of a medium universal plate, in accordance with an exemplary embodiment of the present invention.
Figure 26:
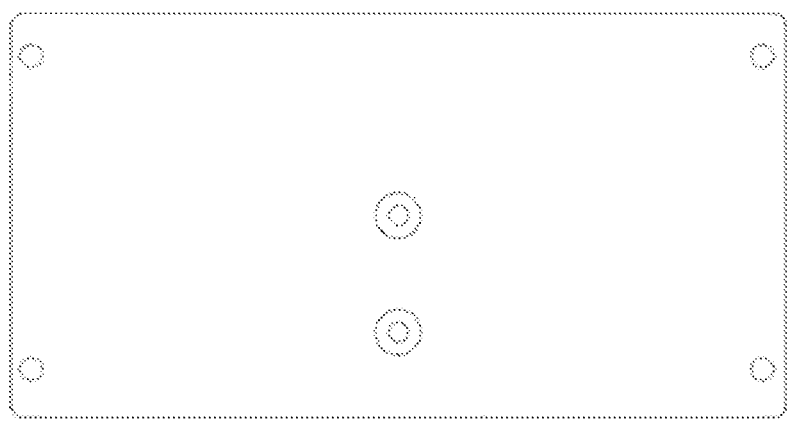
FIG. 26 is a top planar view of a medium universal plate, in accordance with an exemplary embodiment of the present invention.

As depicted best in detail within FIG. 1-4, the second arm assembly 126 may be couplable to the base frame assembly 102 and coupled to a second LUP 128 having a front surface and the mounting aperture configuration 1900 disposed thereon. As depicted best in detail within FIGS. 25-26, the third arm assembly 130 couplable to the base frame assembly 102 and coupled to a medium universal plate (MUP) 132 having a front surface, a rear surface opposing the front surface of the MUP 132, an MUP thickness separating the front and rear surfaces of the MUP 132, and a mounting aperture configuration 2500 defining a plurality of apertures 2502a-n each spanning the MUP thickness. In one embodiment, the second LUP 128 is the same as the LUP 118 and is utilized depending on the location in which the user desires to operate or control the external control or input assembly attached thereto, i.e., in the middle of the user or on the side of the user.

Figure 37:
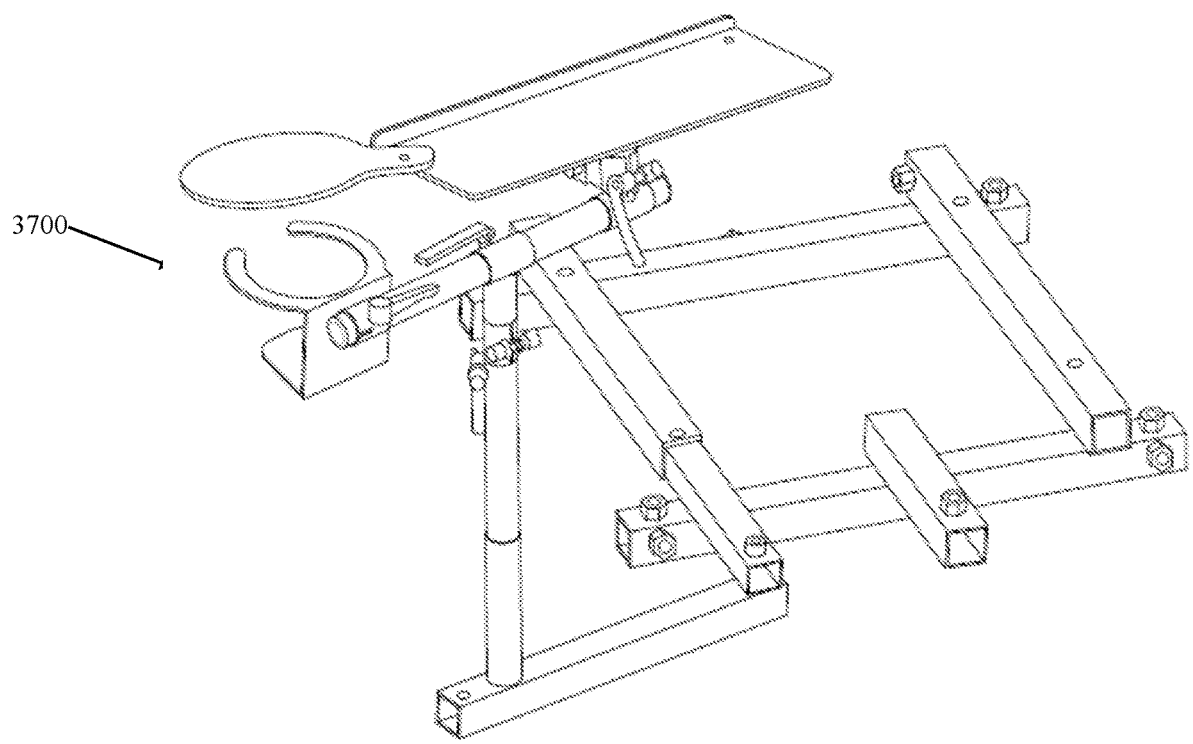
FIG. 37 is a downward facing perspective view of a keyboard/mouse attachment assembly, in accordance with an exemplary embodiment of the present invention.
Figure 38:
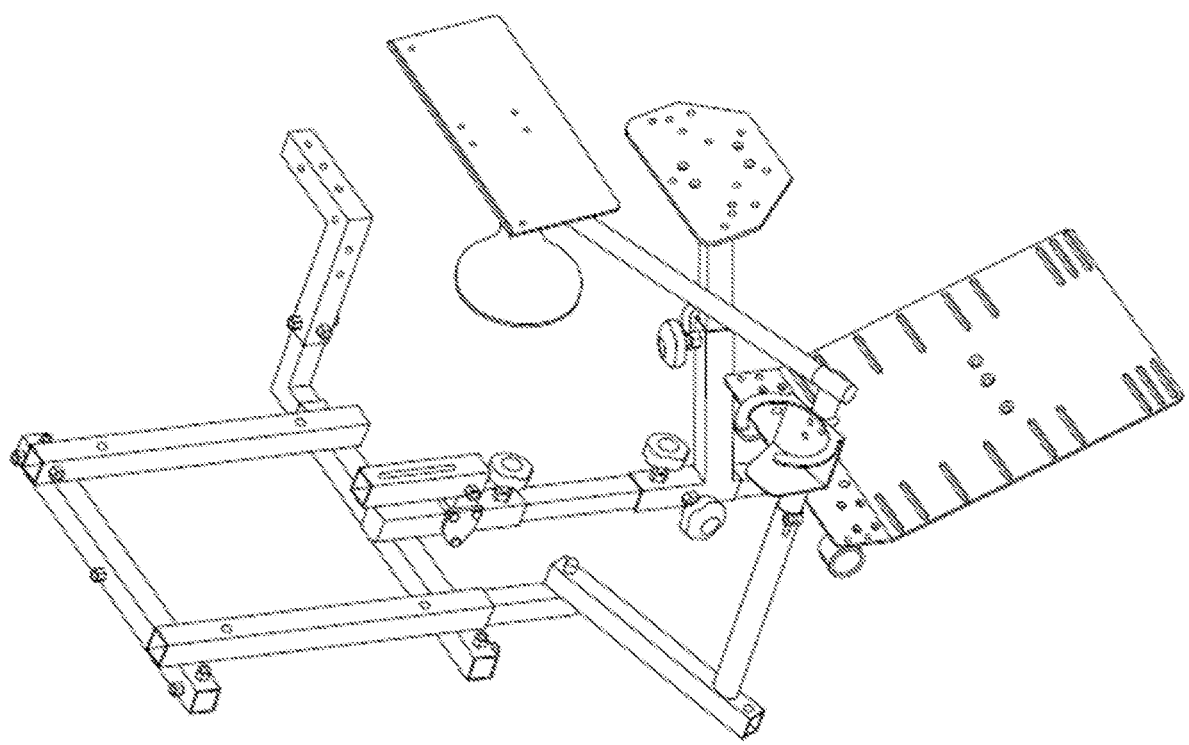
FIG. 38 is a downward facing perspective view of a gaming chair assembly, in accordance with an exemplary embodiment of the present invention.
Figure 39:
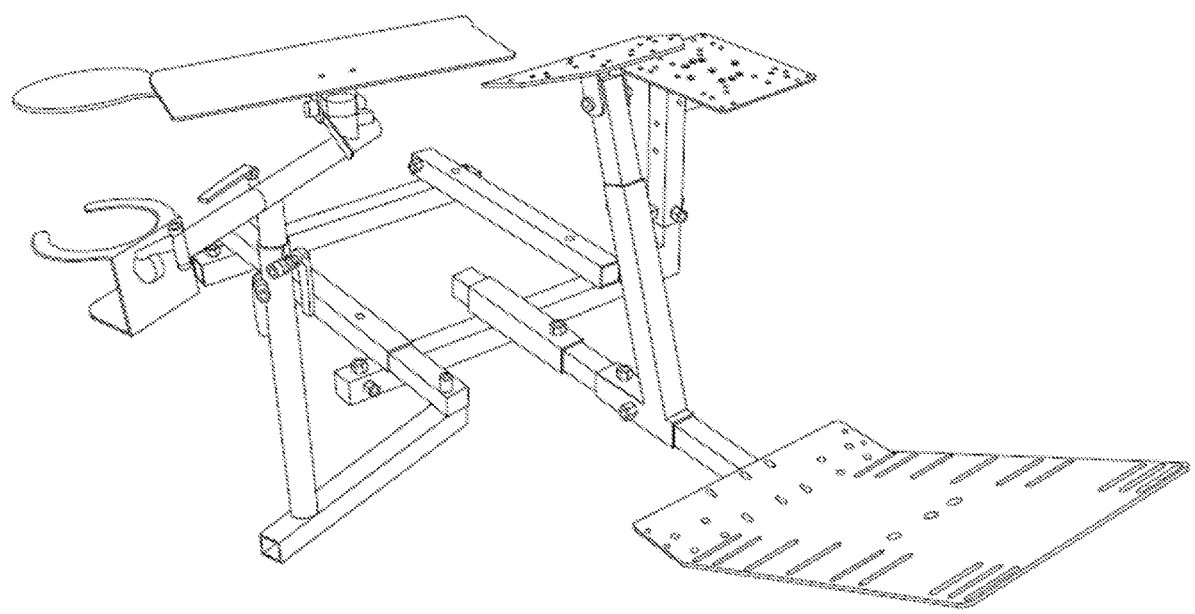
FIG. 39 is a side perspective view of a gaming chair assembly, in accordance with an exemplary embodiment of the present invention.

Additionally, as best shown in FIGS. 37-39, the assembly may also employ the use of a keyboard/mouse/cup holder assembly 3700 that may selectively couple and uncouple as seen in the figures. The keyboard/mouse/cup holder assembly 3700 may also utilize compression fasteners to selectively adjust and position the components of the keyboard/mouse/cup holder assembly 3700.

Beneficially, the user may vary attachment of different plates on the assembly 100, as exemplified in FIGS. 5-8. Additionally, most, if not all, of the aforementioned plates, define a center hole formed thereon for joining said plates to a bracket or other component on the assembly using, for example, a bolt and a lower knob female fastener configured to selectively couple to said bolt. Other components utilized with the assembly are also depicted herein, wherein said functionality will be apparent to those of skill in the art by viewing the figures submitted herewith.

Figure 40:
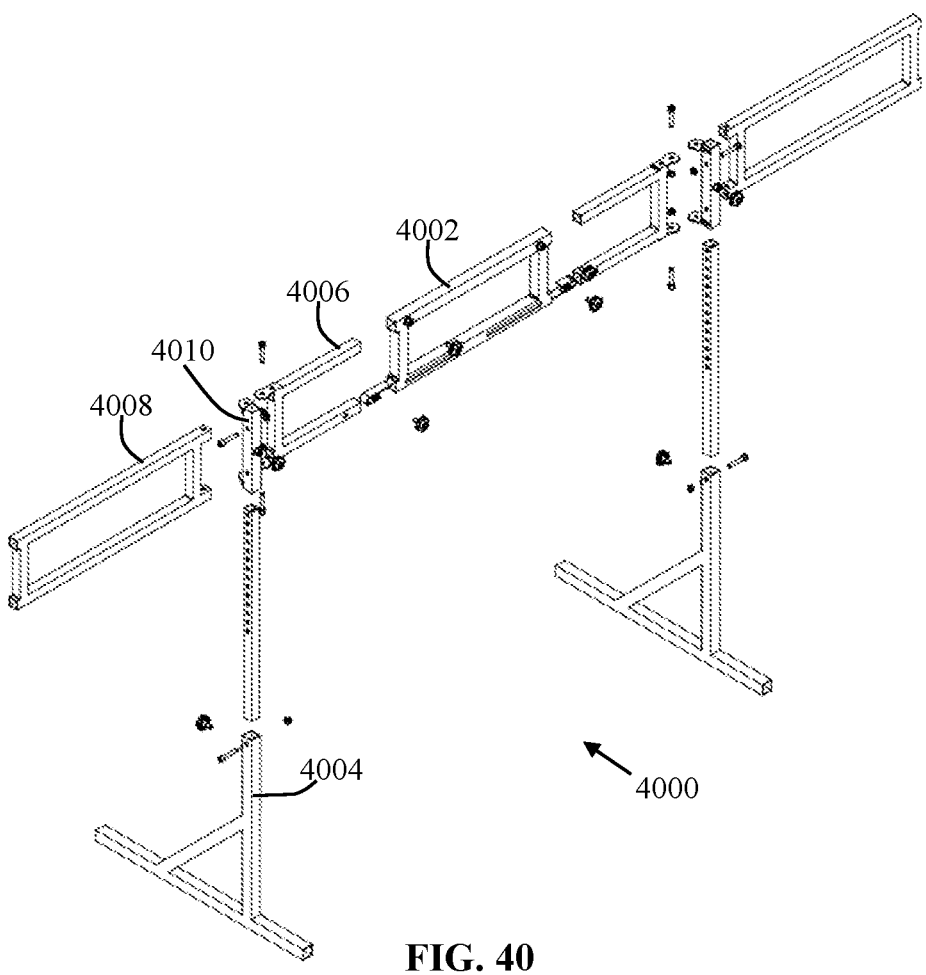
FIG. 40 is a downward facing perspective view of a modular multi-monitor mount system, in accordance with an exemplary embodiment of the present invention.
Figure 46:
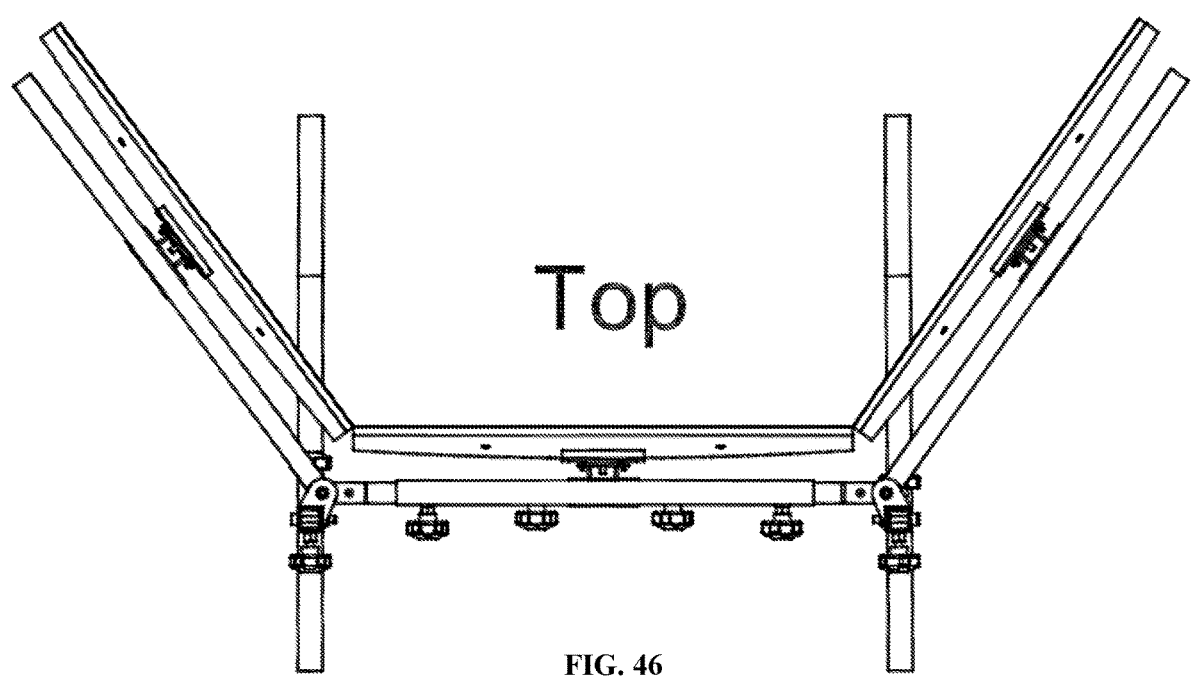
FIG. 46 is a top perspective view of a modular multi-monitor mount system, in accordance with an exemplary embodiment of the present invention.

With reference to FIG. 40, one or more component(s) for a modular multi-monitor mount system are depicted. FIG. 40 depicts an exploded view of the modular multi-monitor mount system 4000, wherein FIGS. 41-45 depict a triple monitor mount system without a plurality of monitors coupled thereto and FIG. 46 depicts the triple monitor mount system with a plurality of monitors coupled thereto. Dimensions of the components depicted therein are exemplary, and may vary outside of said ranges or values based on design constraints and applications.

Figure 41:
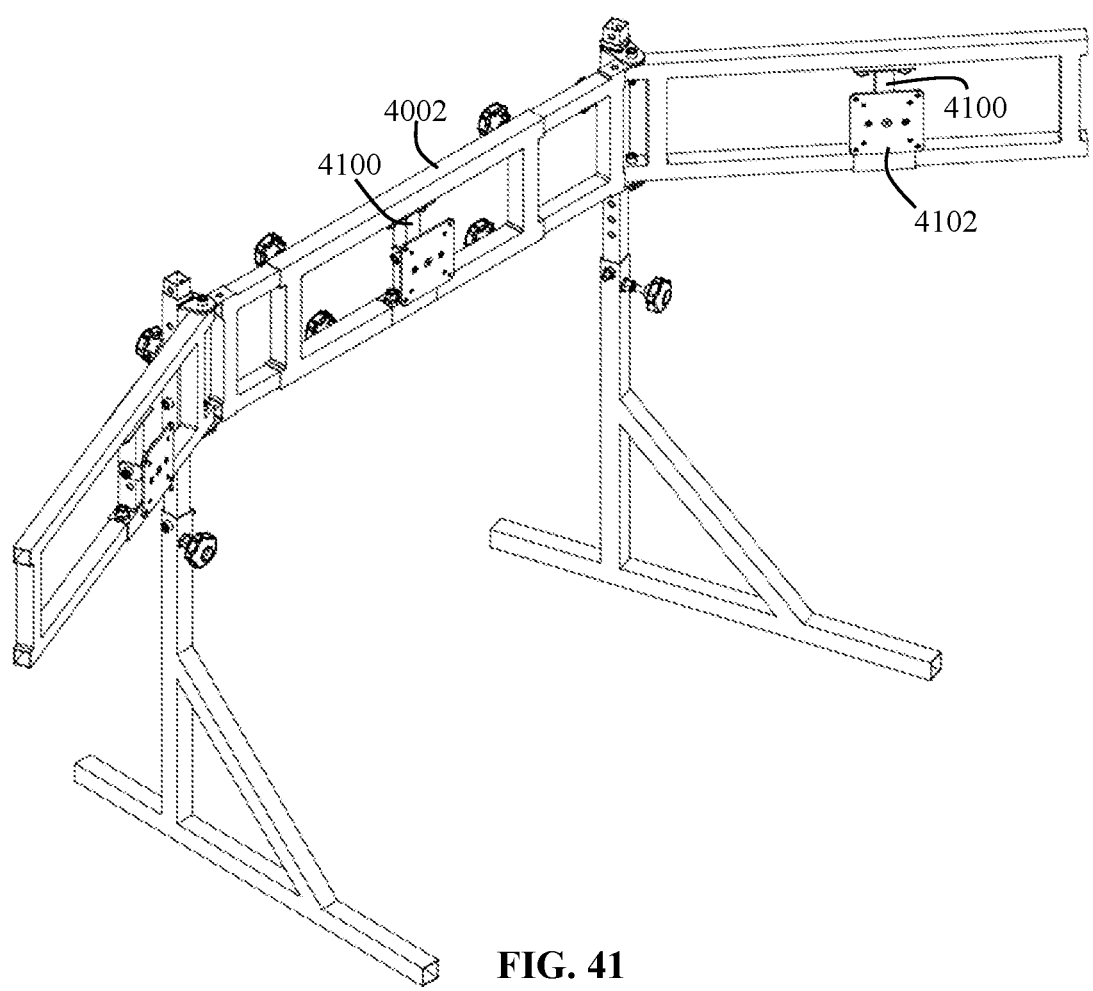
FIG. 41 is a downward facing perspective view of a modular multi-monitor mount system, in accordance with an exemplary embodiment of the present invention.
Figure 42:
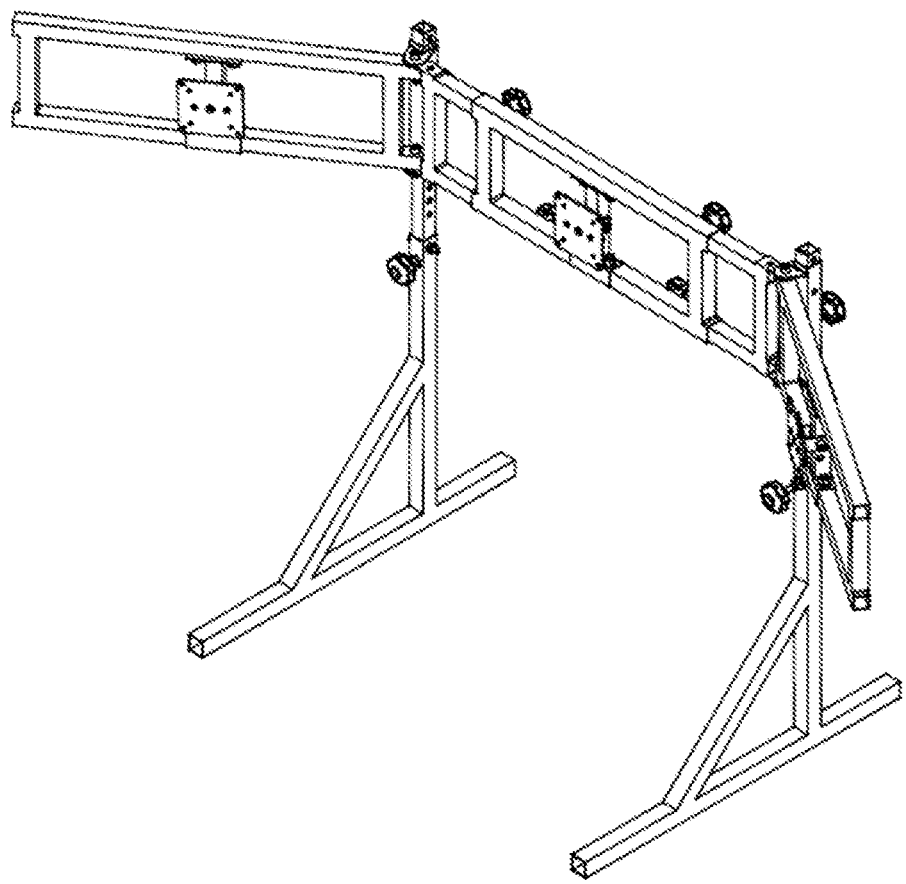
FIG. 42 is a downward facing perspective view of a modular multi-monitor mount system, in accordance with an exemplary embodiment of the present invention.
Figure 43:
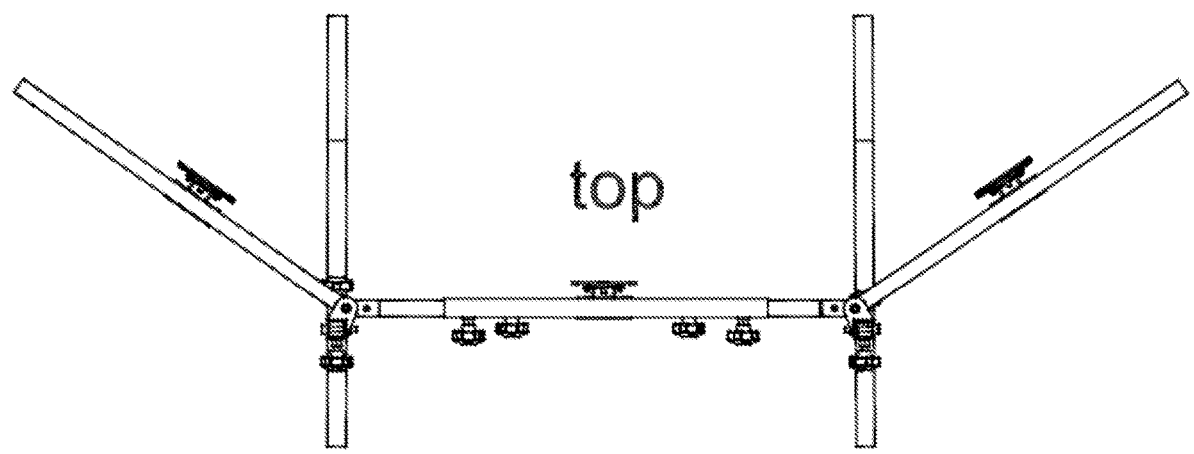
FIG. 43 is a top perspective view of a modular multi-monitor mount system, in accordance with an exemplary embodiment of the present invention.
Figure 44:
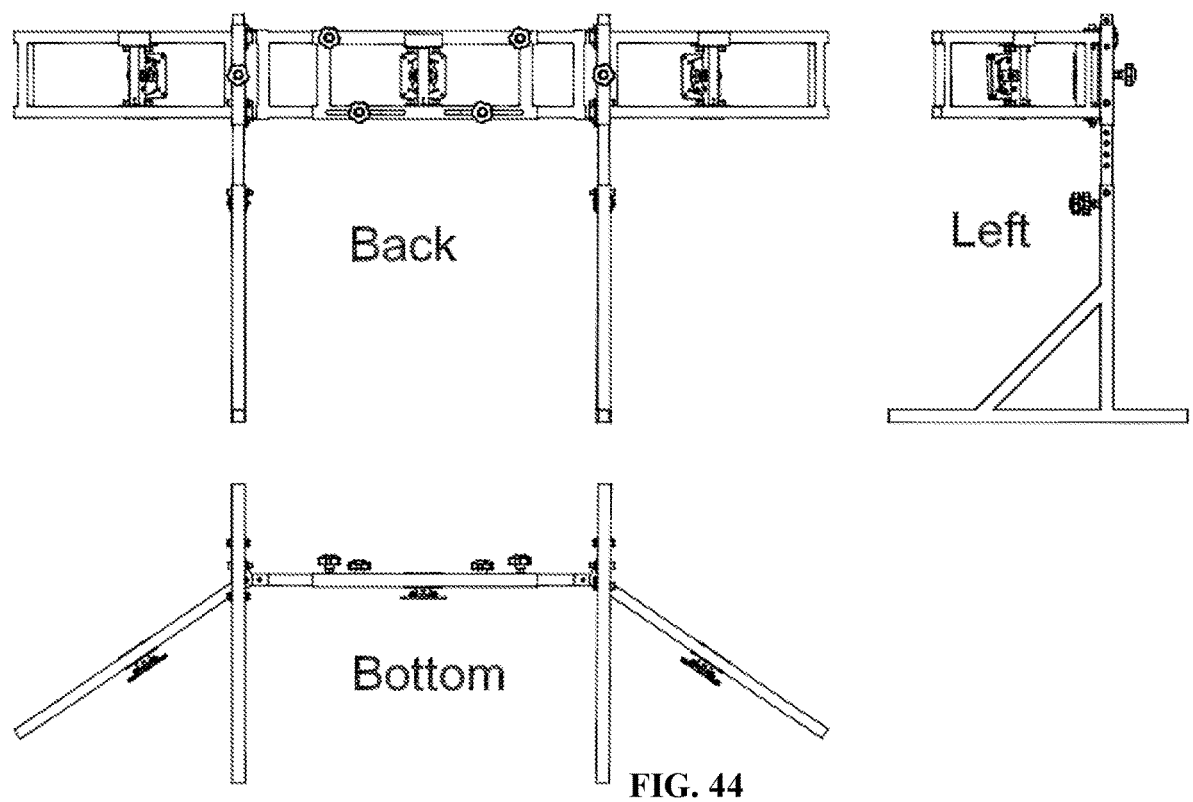
FIG. 44 is a side perspective view of a modular multi-monitor mount system, in accordance with an exemplary embodiment of the present invention.
Figure 45:
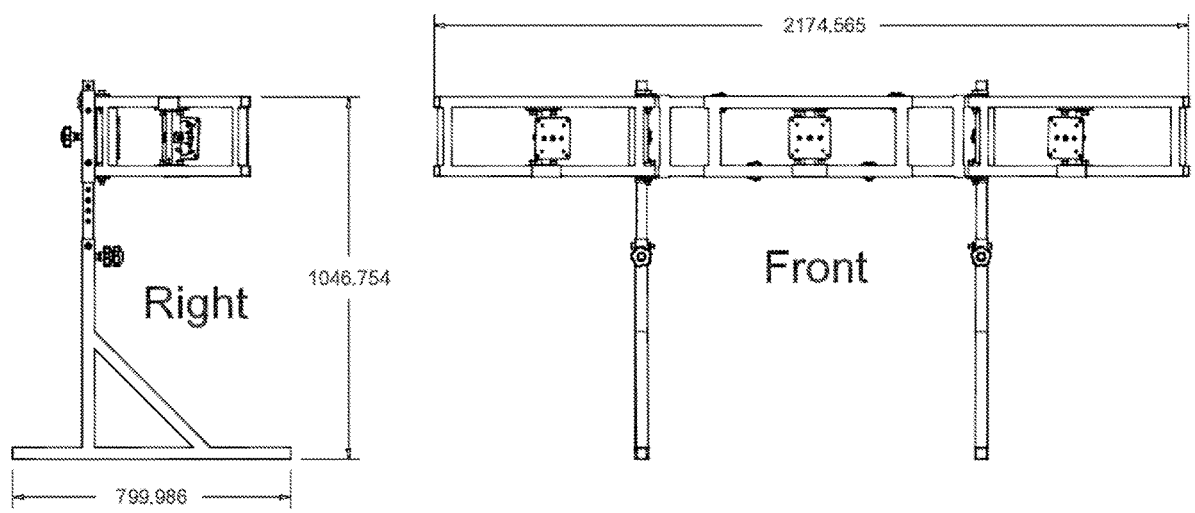
FIG. 45 is a side perspective view of a modular multi-monitor mount system, in accordance with an exemplary embodiment of the present invention.
Figure 47:
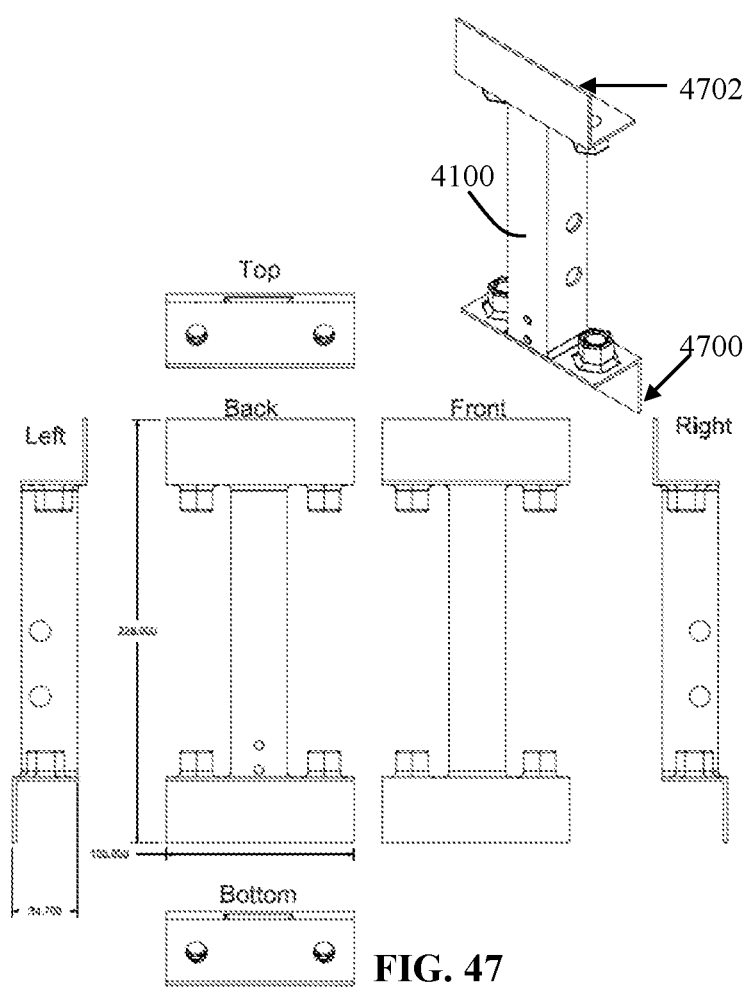
FIG. 47 is a perspective side view of a screen support bracket, in accordance with an exemplary embodiment of the present invention.
Figure 48:
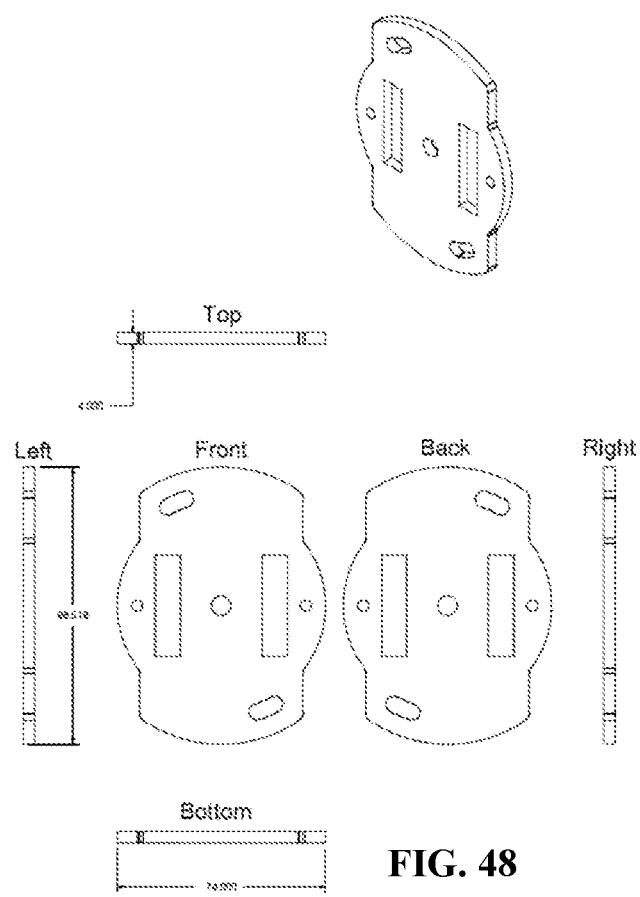
FIG. 48 is a top planar view of a rotation pivot bracket lock, in accordance with an exemplary embodiment of the present invention.
Figure 49:
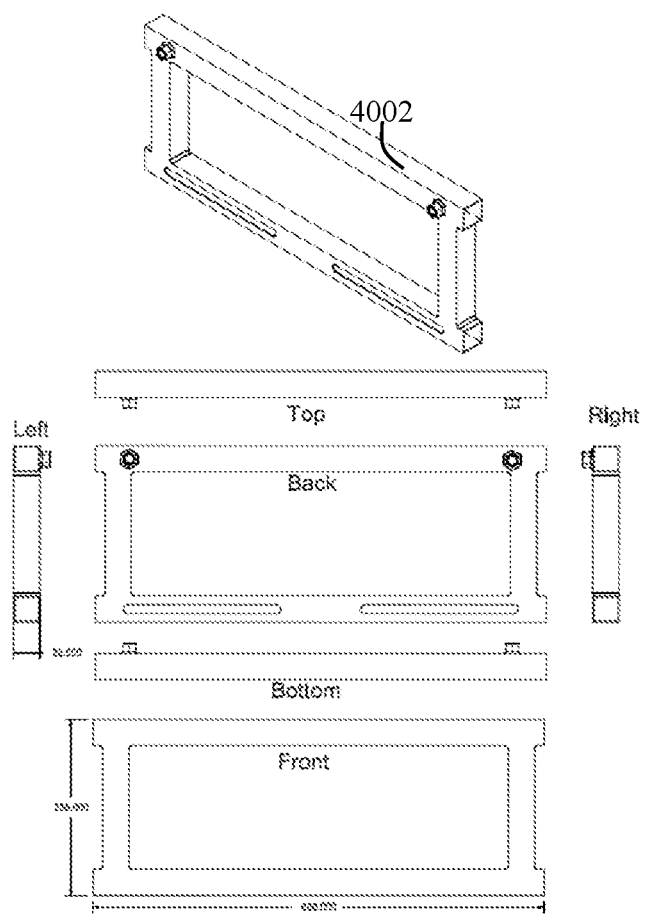
FIG. 49 is a top and side perspective view of a monitor support, in accordance with an exemplary embodiment of the present invention.
Figure 50:
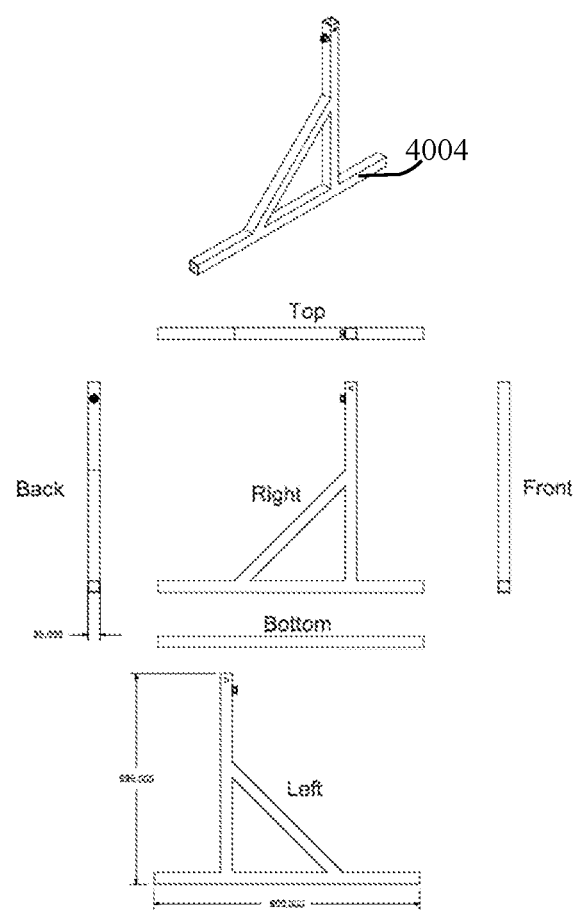
FIG. 50 is a perspective side view of a support leg, in accordance with an exemplary embodiment of the present invention.
Figure 51:
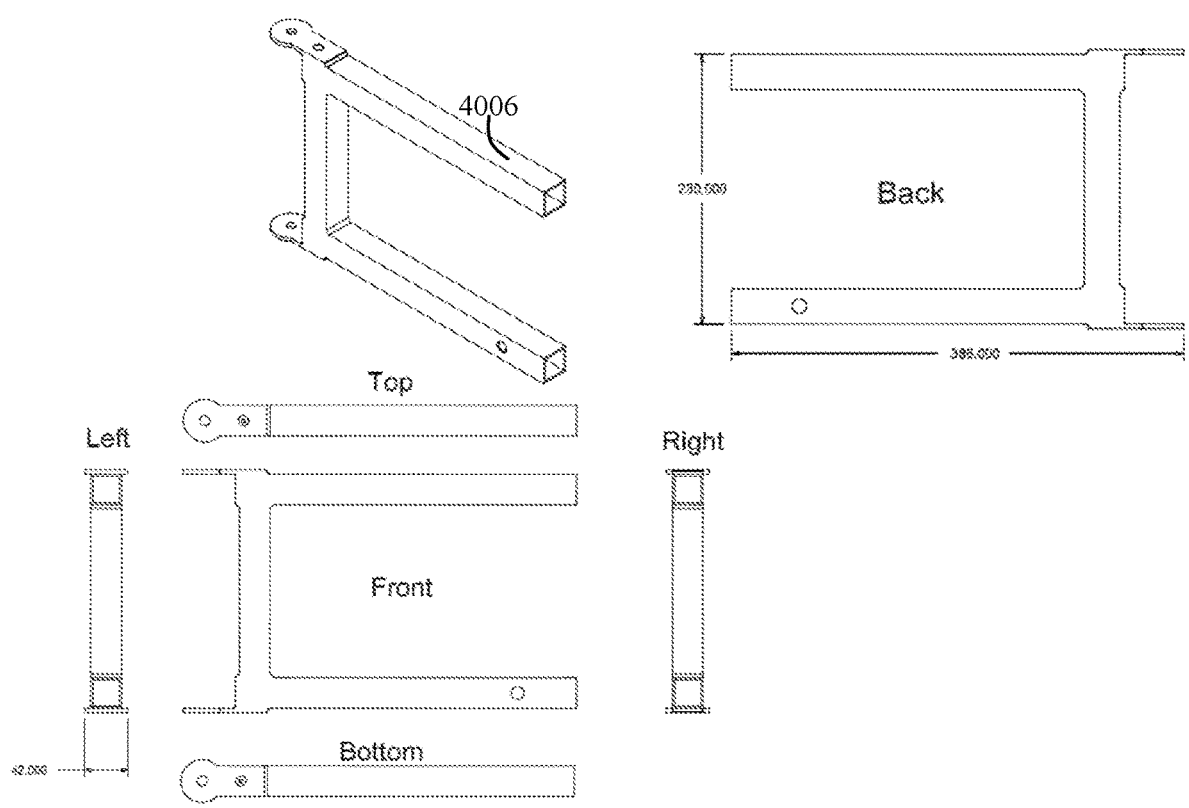
FIG. 51 is a perspective side view of a hinge frame member, in accordance with an exemplary embodiment of the present invention.
Figure 52:
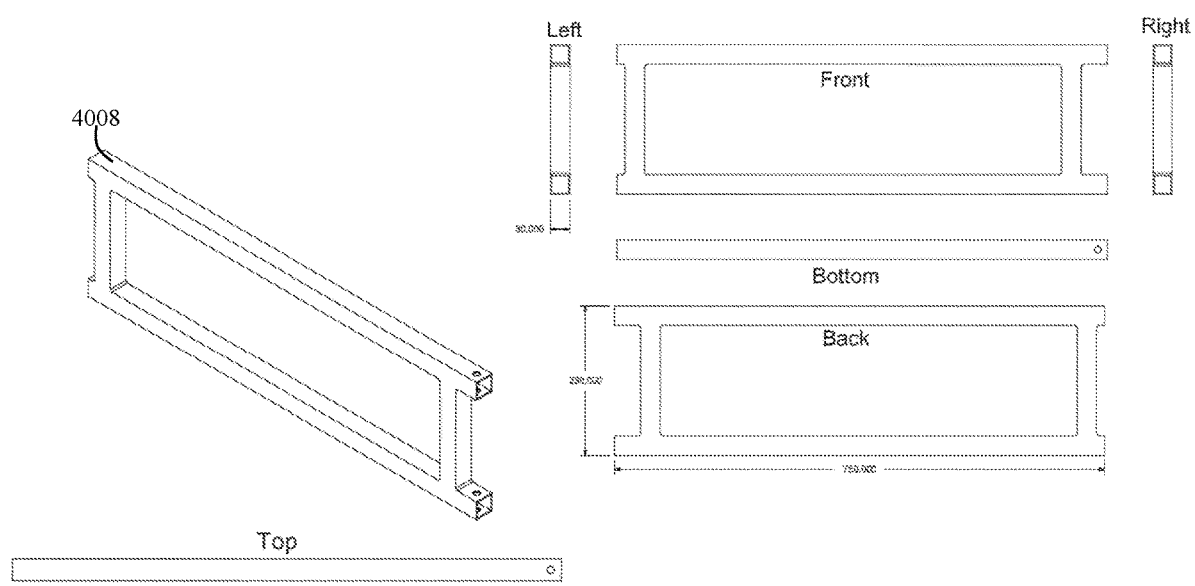
FIG. 52 is a perspective side view of a hinge frame member, in accordance with an exemplary embodiment of the present invention.
Figure 53:
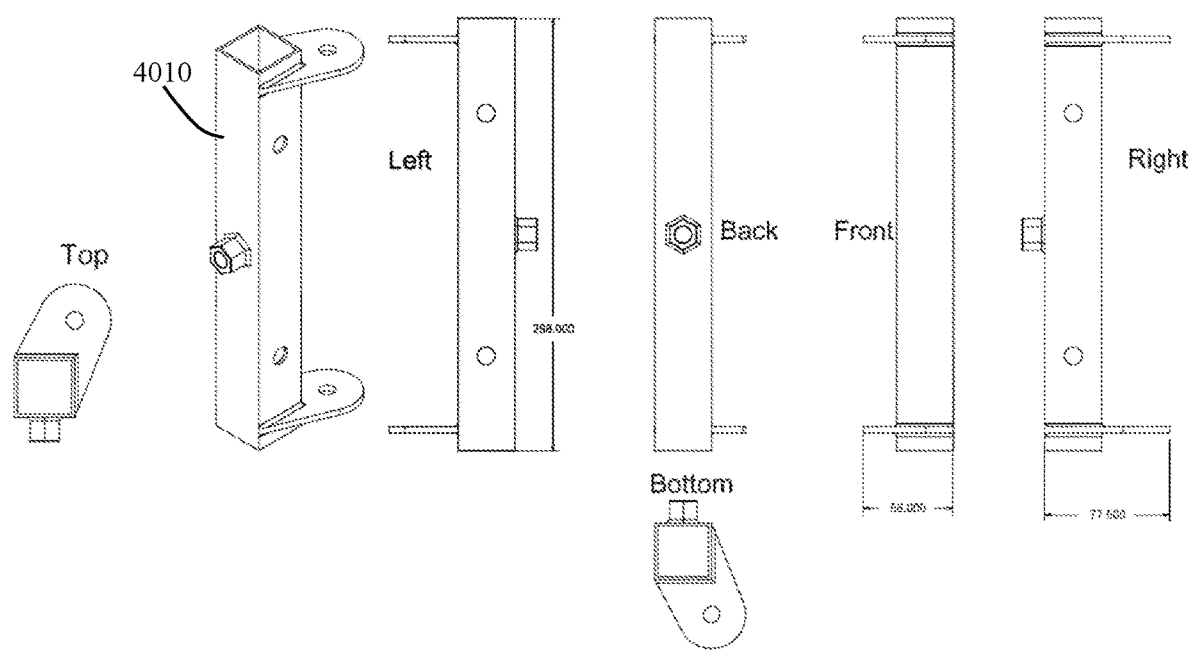
FIG. 53 is a perspective side view of axial supports, in accordance with an exemplary embodiment of the present invention.
Figure 54:
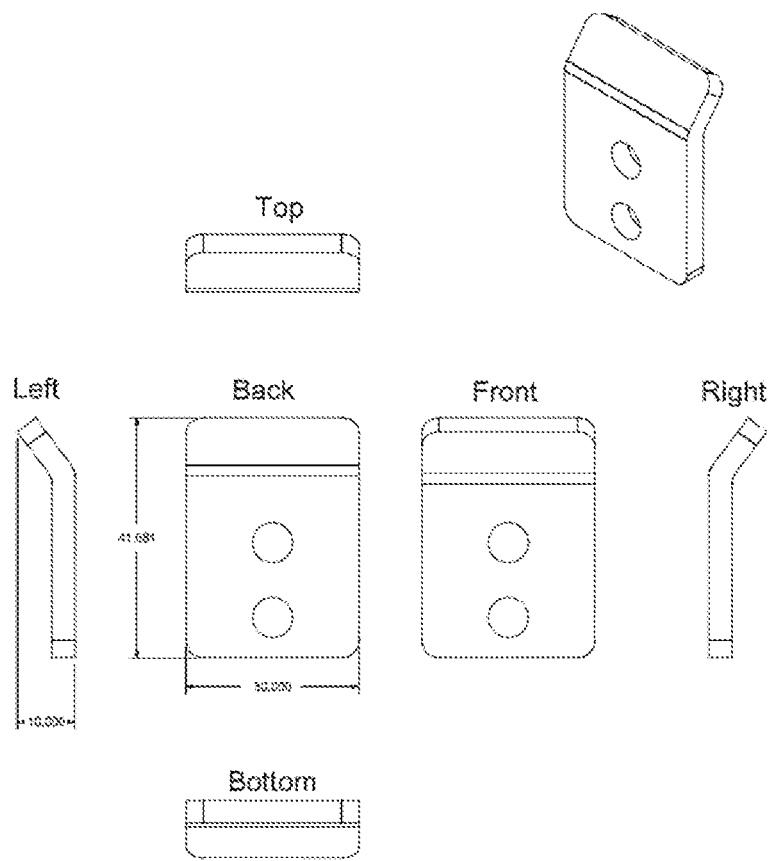
FIG. 54 is a perspective side view of axial supports, in accordance with an exemplary embodiment of the present invention.
Figure 55:
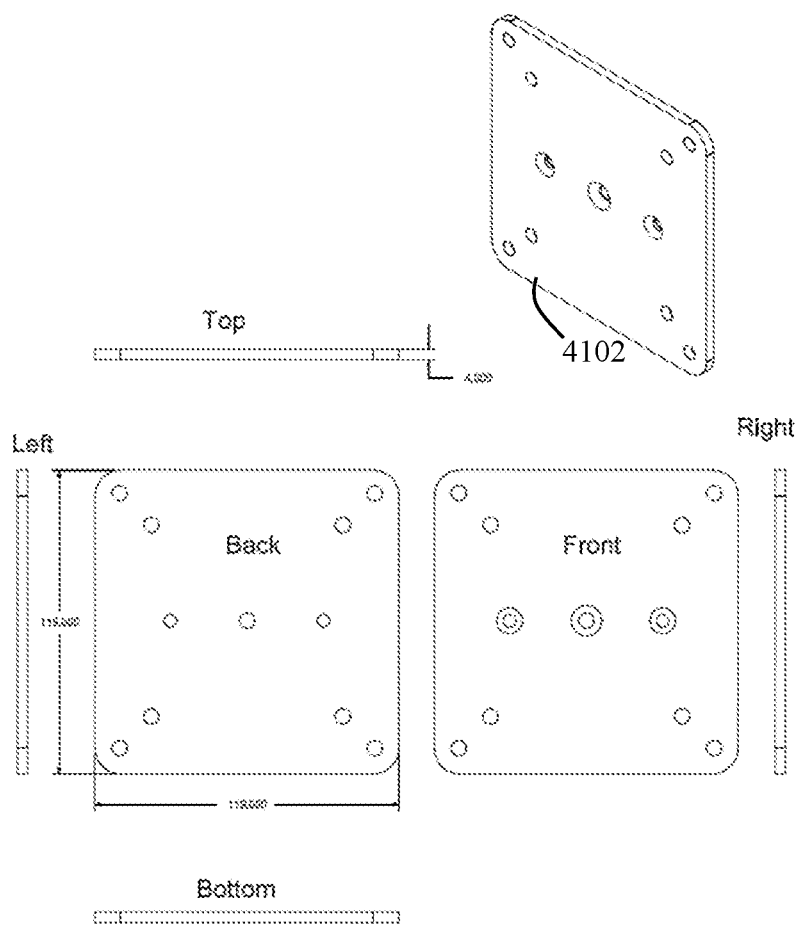
FIG. 55 is a perspective side view of a mounting "vesa" plate, in accordance with an exemplary embodiment of the present invention.

With reference to FIG. 41 and FIG. 47, the system 4000 includes a screen support bracket 4100 beneficially having two opposing ends 4700, 4702 with a unique support wall configuration operably configured to selectively removably and slidably couple with the frame of the monitor mount system. FIG. 48 is a rotation pivot bracket lock in accordance with one embodiment of the present invention. FIG. 49 depicts a monitor support 4002 that is slotted and forms a portion of the frame. FIG. 50 depicts a support leg 4004 that is shaped and sized, or otherwise operably configured, to be selectively removably inserted and removed from a tubular framing structure (as described above and depicted in the figures). The support leg 4004 is also configured to form part of the frame assembly for the system 4000. FIG. 51 depicts a hinge frame member 4006 operably configured to form part of the frame assembly for the system 4000, yet enable coupling of a display thereto. FIG. 52 depicts another hinge frame member 4008 operably configured to form part of the frame assembly for the system 4000, yet enable coupling of a display thereto. FIGS. 53-54 depict axial supports 4010 operably configured to form part of the frame assembly for the system 4000. FIG. 55 depicts a mounting "vesa" plate 4102 operably configured to couple an electronic display (as exemplified in FIG. 46) thereto. The frame assembly of the system 4000 is beneficially operably configured to selectively adjust in height and width (as shown in the figures) to adapt to various sizes of electronic display, yet effectively and efficiently couple with a gaming chair assembly. To lock the various frame members into a particular position, the system may utilize one or more fastener(s) (as depicted in the figures).

Figure 56:
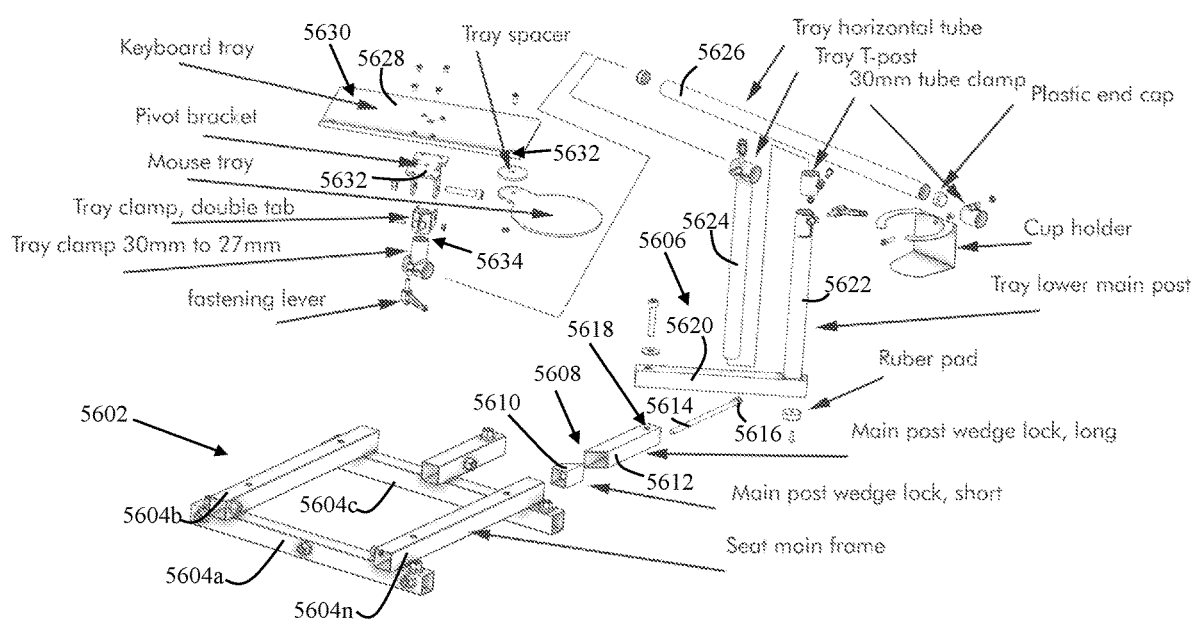
FIG. 56 is an exploded side view of a gaming chair assembly, in accordance with an exemplary embodiment of the present invention.
Figure 57:
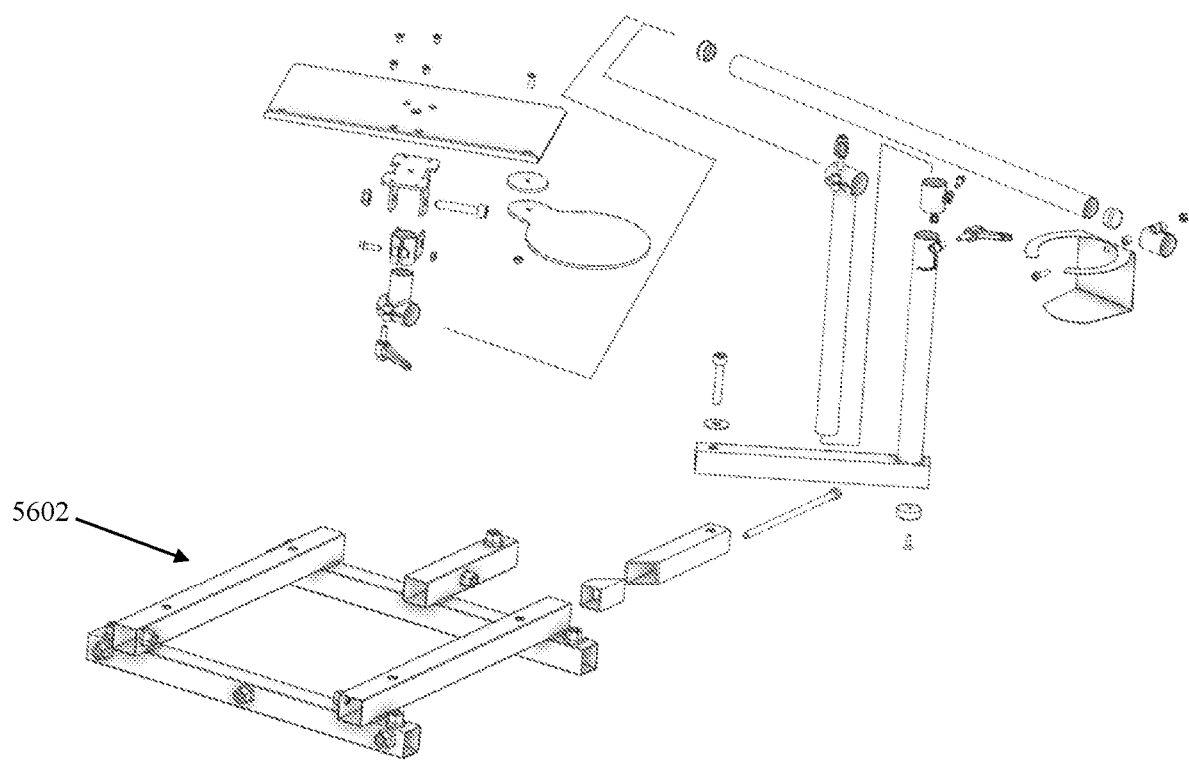
FIG. 57 is an exploded side view of a gaming chair assembly, in accordance with an exemplary embodiment of the present invention.
Figure 58:
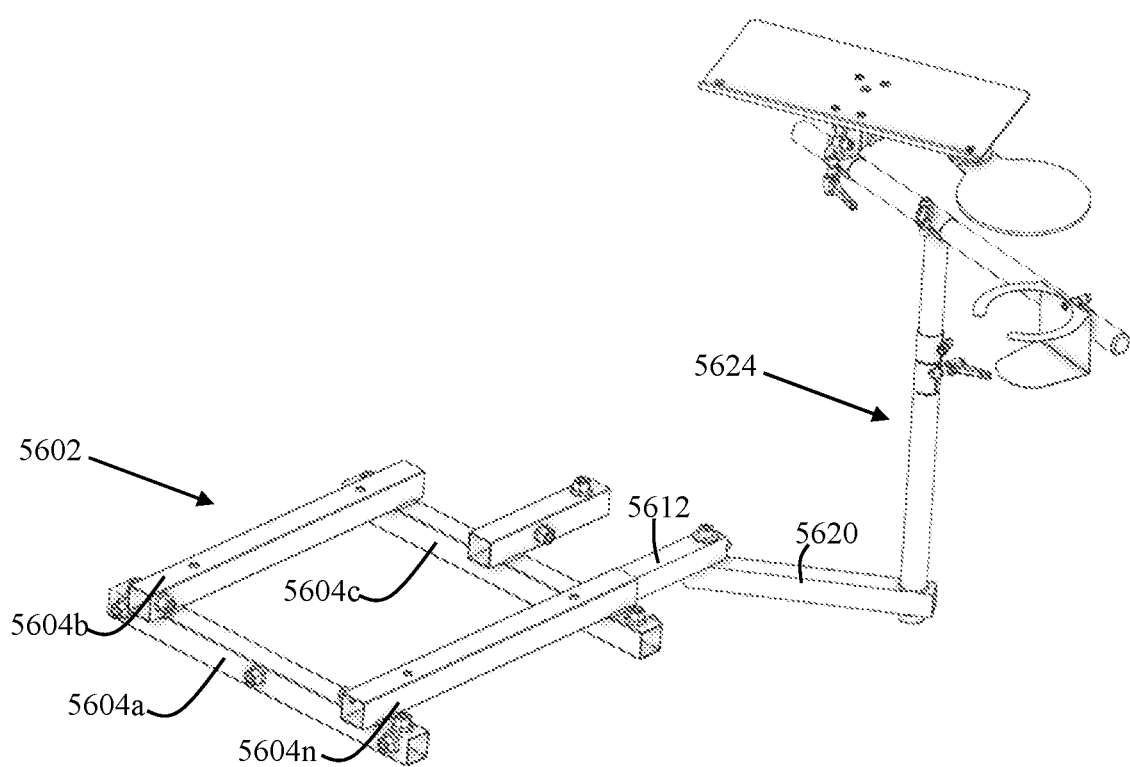
FIG. 58 is an exploded side view of a gaming chair assembly, in accordance with an exemplary embodiment of the present invention.

With reference to FIGS. 56-58, additional views of a gaming chair assembly with adjustable keyboard assembly can be seen. Similar to the above disclosure, the base frame assembly 5602 has a tubular framing configuration, of an internal diameter or thickness of approximately 35 mm. The base frame assembly 5602 beneficially includes a plurality of base frame members 5604$a$-$n$ (wherein "n" represents any number greater than one. The assembly also includes a keyboard tray assembly 5606 having a lower tubular arm member 5608 of an external diameter or thickness of approximately 33 mm. Other dimensional ranges for the tubing, however, is contemplated.

In one embodiment, the lower tubular arm member 5608 is selectively and telescopically coupled to one of the plurality of base frame members 5604$a$-$n$ in a selectively lockable configuration (as best seen in FIG. 37). In one embodiment, the lower tubular arm member 5608 has a first arm member 5610 of a wedged shape and defining a through hole and has a second arm member 5612 of a wedged shape corresponding to the wedged shape of the first arm member 5610 and defining a through hole thereon. The first and second arm members 5610, 5612 may be selectively coupled together with a fastener 5614 disposed in the through holes defined by the first and second arm members 5610, 5612 and is operably configured to selectively lock the lower tubular arm member 5608 with the one of the plurality of base frame members 5604$a$-$n$. In preferred embodiments, the fastener 5614 includes a head 5616 disposed on a terminal end 5618 of the second arm member 5612. The head 5616 may be recessed on the terminal end 5618 of the second arm member 5612 in some embodiments. As those skilled in the art will appreciate, rotation of the fastener 5614 causes the first arm member 5610 to flex outwardly, thereby causing the lower tubular arm member 5608 to selectively and telescopically couple with the one of the plurality of base frame members 5604$a$-$n$.

The assembly can also be seen beneficially having a pivoting lower tubular arm member 5620 rotatably coupled to the lower tubular arm member 5608. Further, the assembly can be seen having a first upright tubular arm member 5622 coupled to the pivoting lower tubular arm member 5620 in a substantially perpendicular orientation (i.e., +/−10°) and configuration and a second upright tubular arm member 5624 telescopically coupled to the first upright tubular arm member 5622 in a selectively lockable configuration. The second upright tubular arm member 5624 has a tubular t-post defining a through hole thereon. A keyboard support member 5626 may be then selectively, slidably, and lockably coupled to the tubular t-post and disposed within the through hole thereon, thereby beneficially enabling support (and adjustment) of a keyboard tray member 5628 and/or the other components depicted in the figures.

The keyboard tray member 5628 may have a substantially planar surface 5630 with a mounting bracket 5632 coupled thereto. The mounting bracket 5632 may include two opposing mounting members configured to receive a fastener therethrough. The mounting bracket 5632 is then pivotably coupled to a tray clamping member 5634, and the tray clamping member 5634 may define a through hole thereon for receiving the fastener received through the mounting bracket 5632. The tray clamping member 5634 may then be selectively, slidably, and lockably coupled to the keyboard support member 5626 through, for example, a clamping assembly. To that end, the components depicted herein may beneficially lock and unlock with respect to one another to selectively adjust linear or rotational movement of the components, thereby providing enhanced adjustability not accomplished with other known devices.

In one embodiment, the plurality of base frame members 5604$a$-$n$ have two base horizontal frame members 5604$a$, 5604$c$ and two base vertical frame members 5604$b$, 5604$d$ in a perpendicular configuration. One of the two base vertical frame members 5604$b$, 5604$d$ may have the lower tubular arm member 5608 selectively and telescopically coupled thereto.

Further, the pivoting lower tubular arm member 5620 may also be pivotably coupled proximal (i.e., at or near) to the terminal end 5618 of the second arm member 5612 and operably configured to rotate at least approximately 180° thereto. Additionally, the keyboard support member 5626 may be of a cylindrical shape and is selectively lockably coupled to the tubular t-post with a clamping assembly. Other known tubular structure, however, are contemplated. Further, the keyboard tray member 5628 also includes a keyboard support surface 5632 disposed at a substantially perpendicular orientation with respect to the substantially planar surface 5630 of the keyboard tray member 5628.

While a specific order of executing the process steps of assembling or disassembling has been described and depicted herein, the order of executing the steps may be changed relative to the order shown in certain embodiments. Also, two or more steps described or depicted in succession may be executed concurrently or with partial concurrence in some embodiments. Certain steps may also be omitted for the sake of brevity. In some embodiments, some or all of the process steps included can be combined into a single process.

What is claimed is:

1. A gaming chair assembly with adjustable keyboard assembly comprising:
   a base frame assembly with a tubular framing configuration having a plurality of base frame members; and
   a keyboard tray assembly having:
      a lower tubular arm member selectively and telescopically coupled to one of the plurality of base frame members in a selectively lockable configuration;
      a pivoting lower tubular arm member rotatably coupled to the lower tubular arm member;
      a first upright tubular arm member coupled to the pivoting lower tubular arm member in a substantially perpendicular orientation and configuration and a second upright tubular arm member telescopically coupled to the first upright tubular arm member in a selectively lockable configuration, the second upright tubular arm member having a tubular t-post defining a through hole thereon;

a keyboard support member selectively, slidably, and lockably coupled to the tubular t-post and disposed within the through hole thereon; and a keyboard tray member with a substantially planar surface and with a mounting bracket coupled thereto, the mounting bracket pivotably coupled to a tray clamping member, and the tray clamping member with a through hole defined thereon and selectively, slidably, and lockably coupled to the keyboard support member.

2. The gaming chair assembly with adjustable keyboard assembly according to claim 1, wherein the lower tubular arm member further comprises:

a first arm member of a wedged shape and defining a through hole and a second arm member of a wedged shape corresponding to the wedged shape of the first arm member and defining a through hole, wherein the first and second arm members are selectively coupled together with a fastener disposed in the through holes defined by the first and second arm members and operably configured to selectively lock the lower tubular arm member with the one of the plurality of base frame members.

3. The gaming chair assembly with adjustable keyboard assembly according to claim 2, wherein the fastener includes a head disposed on a terminal end of the second arm member.

4. The gaming chair assembly with adjustable keyboard assembly according to claim 3, wherein the plurality of base frame members further comprise:

two base horizontal frame members and two base vertical frame members in a perpendicular configuration, one of the two base vertical frame members having the lower tubular arm member selectively and telescopically coupled thereto.

5. The gaming chair assembly with adjustable keyboard assembly according to claim 3, wherein the pivoting lower tubular arm member is pivotably coupled proximal to the terminal end of the second arm member and operably configured to rotate at least approximately 180° thereto.

6. The gaming chair assembly with adjustable keyboard assembly according to claim 1, wherein the keyboard support member is of a cylindrical shape and is selectively lockably coupled to the tubular t-post with a clamping assembly.

7. The gaming chair assembly with adjustable keyboard assembly according to claim 1, wherein the keyboard tray member includes a keyboard support surface disposed at a substantially perpendicular orientation with respect to the substantially planar surface of the keyboard tray member.

8. The gaming chair assembly with adjustable keyboard assembly according to claim 1, wherein the gaming chair base structure assembly further comprises:

at least one lower leg, an extension member selectively removably translatable within, using a telescopic connection, the at least one lower leg, an axial support member having an upper and lower hinge member disposed thereon, a center monitor support member rotatably coupled to, and selectively translatable from, using a telescopic connection, the axial support member through a hinge frame member, another hinge frame member rotatably coupled to the axial support member, and a plurality of screen support brackets each selectively translatably and directly coupled to the center monitor support member and the another hinge frame member, the plurality of screen support brackets each operably configured to attach to a plate for coupling an electronic display thereto.

\* \* \* \* \*